(12) United States Patent　　(10) Patent No.: US 8,780,227 B2
Akiyama　　(45) Date of Patent: Jul. 15, 2014

(54) IMAGE PICK-UP DEVICE, CONTROL METHOD, RECORDING MEDIUM, AND PORTABLE TERMINAL PROVIDING OPTIMIZATION OF AN IMAGE PICK-UP CONDITION

(75) Inventor: Hirokatsu Akiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 327 days.

(21) Appl. No.: 12/595,464

(22) PCT Filed: Apr. 21, 2008

(86) PCT No.: PCT/JP2008/057700
§ 371 (c)(1),
(2), (4) Date: Oct. 9, 2009

(87) PCT Pub. No.: WO2008/133237
PCT Pub. Date: Nov. 6, 2008

(65) Prior Publication Data
US 2010/0103286 A1　　Apr. 29, 2010

(30) Foreign Application Priority Data

Apr. 23, 2007　(JP) ................................ 2007-113291

(51) Int. Cl.
　　*H04N 5/76*　　(2006.01)
　　*H04N 5/262*　　(2006.01)
　　*H04N 5/228*　　(2006.01)
　　*H04N 5/232*　　(2006.01)

(52) U.S. Cl.
　　USPC ..................... 348/231.6; 348/239; 348/222.1; 348/345

(58) Field of Classification Search
CPC .. H04N 5/262; H04N 5/2356; H04N 5/23212
USPC ............................ 348/231.6, 239, 222.1, 345
See application file for complete search history.

(56) References Cited

U.S. PATENT DOCUMENTS

| 5,835,641 | A | 11/1998 | Sotoda et al. |
| 5,982,912 | A | 11/1999 | Fukui et al. |
| 7,098,946 | B1 * | 8/2006 | Koseki et al. ............. 348/229.1 |
| 7,873,190 | B2 * | 1/2011 | Yuasa et al. .................. 382/118 |
| 2002/0152390 | A1 | 10/2002 | Furuyama et al. |
| 2003/0071891 | A1 | 4/2003 | Geng |
| 2004/0071338 | A1 * | 4/2004 | Nefian .......................... 382/159 |

(Continued)

FOREIGN PATENT DOCUMENTS

| EP | 1640911 A1 | 3/2006 |
| JP | 4-346580 A | 2/1992 |

(Continued)

*Primary Examiner* — Twyler Haskins
*Assistant Examiner* — Quang Le
(74) *Attorney, Agent, or Firm* — Birch, Stewart, Kolasch & Birch, LLP

(57) ABSTRACT

An image pick-up device having an image pick-up condition adjuster that instructs an image pick-up condition optimizer to optimizes an image pick-up condition relative to an object included in a pick-up candidate image corresponding to pick-up candidate image object feature information and an indicator that causes a display section to display at least one item of personal information associated with the object feature information when the pick-up candidate image includes the image of the object which represents feature matching with or a similarity to the feature represented by the object feature information.

5 Claims, 12 Drawing Sheets

(56) References Cited

U.S. PATENT DOCUMENTS

| | | |
|---|---|---|
| 2004/0103372 A1* | 5/2004 | Graham .................. 715/513 |
| 2004/0138915 A1 | 7/2004 | Kataoka et al. |
| 2004/0207743 A1* | 10/2004 | Nozaki et al. ............ 348/333.12 |
| 2005/0219395 A1 | 10/2005 | Sugimoto |
| 2006/0210264 A1 | 9/2006 | Saga |
| 2007/0019081 A1 | 1/2007 | Nakashima |
| 2007/0019083 A1 | 1/2007 | Nakashima |
| 2007/0030381 A1 | 2/2007 | Maeda |
| 2007/0110422 A1 | 5/2007 | Minato et al. |
| 2007/0171296 A1* | 7/2007 | Tsukiji et al. ............. 348/345 |
| 2008/0063389 A1* | 3/2008 | Fang et al. .................. 396/56 |
| 2009/0135269 A1 | 5/2009 | Nozaki et al. |
| 2009/0180696 A1 | 7/2009 | Minato et al. |

FOREIGN PATENT DOCUMENTS

| | | |
|---|---|---|
| JP | 6-217187 A | 8/1994 |
| JP | 9-251534 A | 9/1997 |
| JP | 2002-229955 A | 8/2002 |
| JP | 2002-333652 A | 11/2002 |
| JP | 2003-150932 A | 5/2003 |
| JP | 2003-274271 A | 9/2003 |
| JP | 2003-288601 A | 10/2003 |
| JP | 2004-178256 A | 6/2004 |
| JP | 2005-86682 A | 3/2005 |
| JP | 2005-160122 A | 6/2005 |
| JP | 2005-250972 A | 9/2005 |
| JP | 2005-286940 A | 10/2005 |
| JP | 2005-347985 A | 12/2005 |
| JP | 2006-31183 A | 2/2006 |
| JP | 2006-101111 A | 4/2006 |
| JP | 2006-101186 A | 4/2006 |
| JP | 2006-165822 A | 6/2006 |
| JP | 2006-201282 A | 8/2006 |
| JP | 2006-295888 A | 10/2006 |
| JP | 2006-319596 A | 11/2006 |
| JP | 2007-6033 A | 1/2007 |
| JP | 2007-20104 A | 1/2007 |
| JP | 2007-20105 A | 1/2007 |
| JP | 2007-150601 A | 6/2007 |
| WO | WO 2006/097902 A2 | 9/2006 |

* cited by examiner

F I G. 2
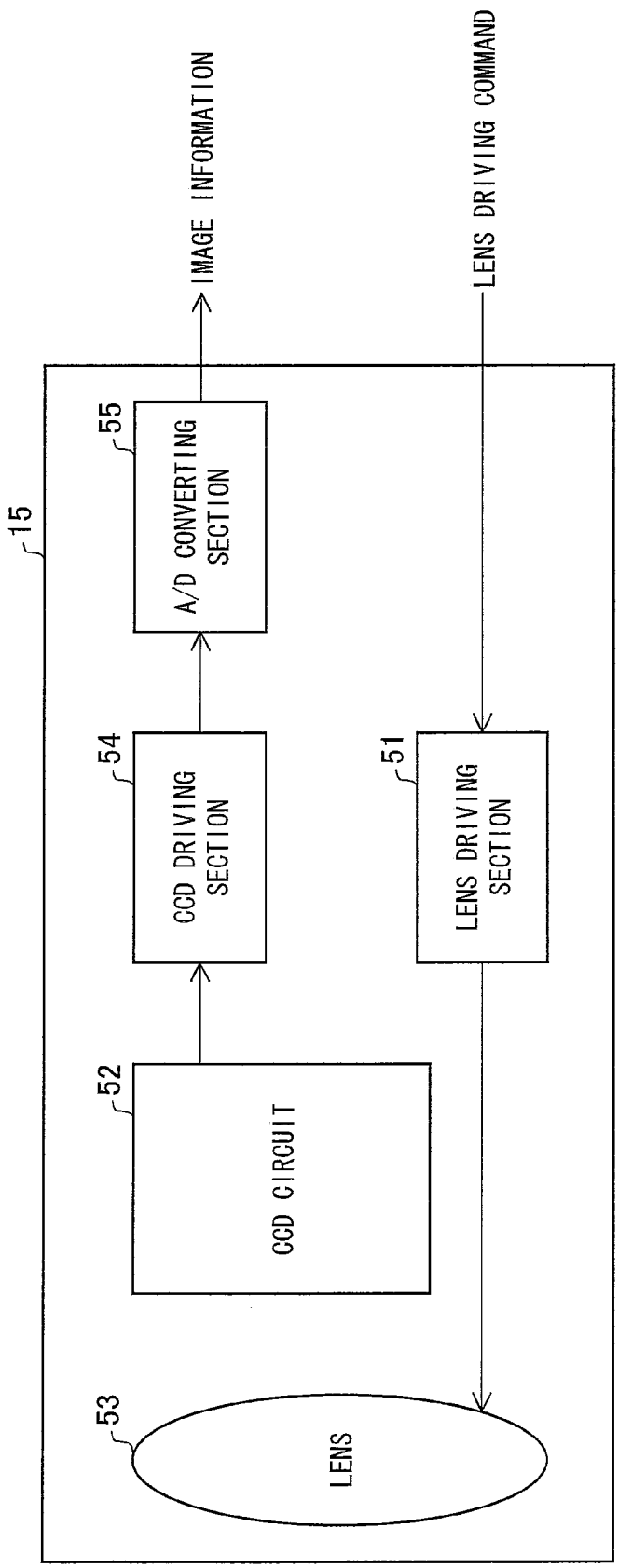

F I G. 9
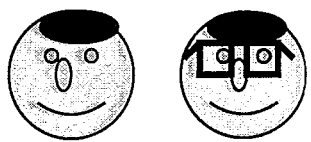
```
010      GROUP 07: COMPANY
BRANCH MANAGER, OSAWA (WRITTEN IN JAPANESE KANA)
BRANCH MANAGER, OSAWA (WRITTEN IN JAPANESE KANJI)
        1 : 03-WXYZ-0001
        2 : 090-WXYZ-0001
        osawa.hiro@XXX.co.jp
```

FIG. 11
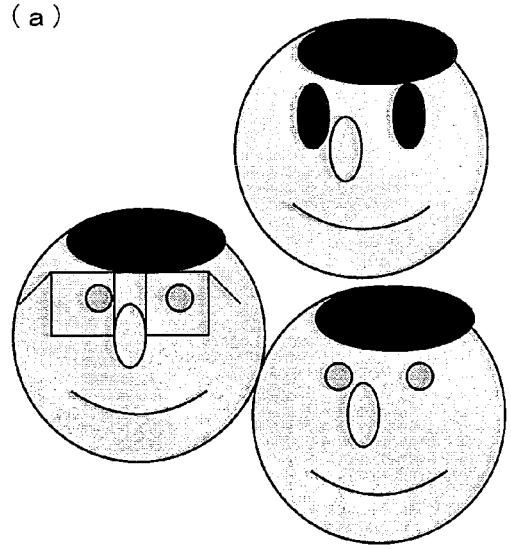
(a)
BRANCH MANAGER, OSAWA
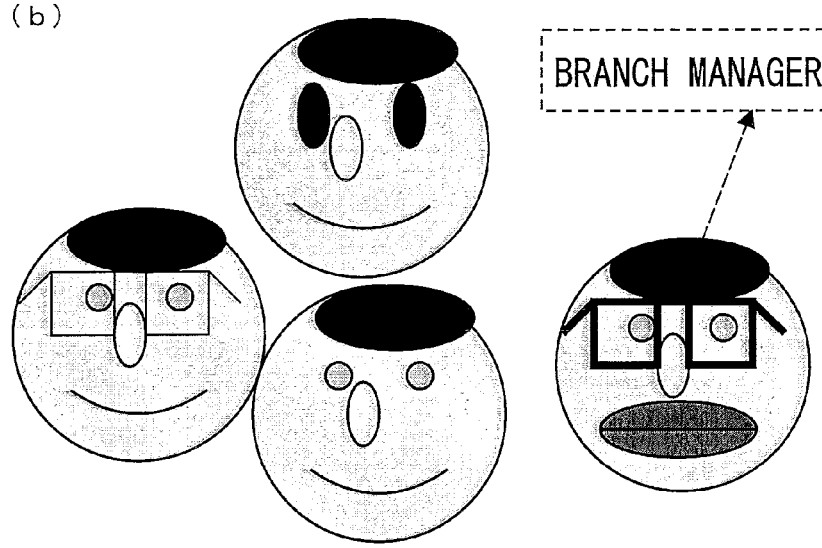
(b)
BRANCH MANAGER, OSAWA
BRANCH MANAGER, OSAWA

IMAGE PICK-UP DEVICE, CONTROL METHOD, RECORDING MEDIUM, AND PORTABLE TERMINAL PROVIDING OPTIMIZATION OF AN IMAGE PICK-UP CONDITION

TECHNICAL FIELD

The present invention relates to: an image pick-up device for optimizing an image pick-up condition such as a focus and/or brightness for a predetermined object for an image pick-up; a computer readable recording medium storing a program for controlling the image pick-up device; and a control method of the image pick-up device.

BACKGROUND ART

There has been known an image pick-up device (e.g., a camera or a video camera) provided with a function for enabling the device to automatically adjust a focus and brightness for a certain object in an object space to be picked up, so that the image of the certain object is picked up more clearly.

For example, Patent Literatures 1 to 4 each disclose an image pick-up device that recognizes, as a certain object, a person in an object space to be picked up, and automatically adjusts a focus and brightness for the person. Specifically, each image pick-up device disclosed in Patent Literatures 1 to 4 recognizes the person (or the face of the person) by (i) extracting e.g., a luminance distribution and a color signal level distribution from the image of the object space to be picked up and (ii) detecting, in accordance with the distributions, a skin-color region and a feature such as an eye, a nose, and/or a mouth in the image. Further, in order to clearly pick up an image of the recognized person, the image pick-up device corrects the values of e.g., a focus, a white color temperature (white balance), and the amount of light exposure (the amount of light) measured during the image pick-up so that these values attain appropriate values.

However, in each image pick-up device in Patent Literatures 1 to 4, such a configuration is not disclosed that adjusts a focus and brightness for a desired person in a case where a plurality of persons exist in an object space to be picked up. Therefore, Patent Literatures 1 to 4 have a problem that, in the case where a plurality of persons exist in an object space to be picked up, the image pick-up device, which automatically adjusts a focus and brightness, cannot adjust the focus and brightness for the desired person.

In order to deal with this problem, for example, Patent Literatures 5 and 6 each disclose an image pick-up device that requires a user to optionally select an object to be subjected to adjustment of a focus and brightness. Specifically, Patent Literature 5 discloses an image pick-up device that registers a feature of an object optionally selected by a user, and identifies the object in accordance with the feature registered, so as to adjust a focus and brightness for the object. Patent Literature 6 discloses an image pick-up device that registers features of objects in advance, and identifies, in accordance with the features registered, an object optionally selected by a user from among the objects whose features have been registered, so as to adjust a focus and brightness for the object.

Patent Literature 7 discloses an information terminal device and an authentication system, each including a registration program for enabling learning and registration of the image data of a user.

CITATION LIST

Patent Literature 1
Japanese Patent Application Publication, Tokukai, No. 2005-286940 A (Publication Date: Oct. 13, 2005)
Patent Literature 2
Japanese Patent Application Publication, Tokukai, No. 2006-201282 A (Publication Date: Aug. 3, 2006)
Patent Literature 3
Japanese Patent Application Publication, Tokukai, No. 2006-319596 A (Publication Date: Nov. 24, 2006)
Patent Literature 4
Japanese Patent Application Publication, Tokukai, No. 2005-160122 A (Publication Date: Jun. 16, 2005)
Patent Literature 5
Japanese Patent Application Publication, Tokukaihei, No. 6-217187 A (Publication Date: Aug. 5, 1994)
Patent Literature 6
Japanese Patent Application Publication, Tokukai, No. 2006-101186 A (Publication Date: Apr. 13, 2006)
Patent Literature 7
Japanese Patent Application Publication, Tokukai, No. 2002-229955 A (Publication Date: Aug. 16, 2002)
Patent Literature 8
Japanese Patent Application Publication, Tokukai, No. 2005-250972 A (Publication Date: Sep. 15, 2005)

SUMMARY OF INVENTION

Technical Problem

However, each image pick-up device disclosed in Patent Literatures 5 and 6 has a problem that, in a case where a plurality of objects exist, the process for identifying an object desired by a user and adjusting image pick-up conditions such as a focus and brightness for the object is troublesome.

That is, in order to make adjustable a focus and brightness for an object desired by a user, the image pick-up device disclosed in Patent Literature 5 requires an extra effort of registering, every time the subject object is changed from one to another, a feature of the object selected by the user. Therefore, the image pick-up device disclosed in Patent Literature 5 has a problem that the process of identifying an object desired by a user and adjusting image pick-up conditions such as a focus and brightness for the object is troublesome.

In order to make adjustable a focus and brightness for an object desired by a user, the image pick-up device disclosed in Patent Literature 6 requires an extra effort of selecting the desired object on a touch panel. Therefore, the image pick-up device disclosed in Patent Literature 6 has a problem that the process for identifying an object desired by a user and adjusting image pick-up conditions such as a focus and brightness for the object is troublesome. Further, in a case where the object is moving, it is difficult to follow the object in motion on the touch panel and select it as a desired object. Therefore, the image pick-up device disclosed in Patent Literature 6 also has a problem that the process of identifying an object desired by a user and adjusting image pick-up conditions such as a focus and brightness for the object is difficult.

The present invention was made in view of the foregoing problems conventionally occurred, and an object of the present invention is to provide: an image pick-up device for more easily identifying, even in a case where a plurality of objects exist, an object desired by a user and optimizing an image pick-up condition for the object; a computer readable recording medium storing a program for controlling the image pick-up device; and a control method of the image pick-up device.

In order to solve the foregoing problems, an image pick-up device according to the present invention is an image pick-up device for an image pick-up of an object space, including: object feature learning means for (a) detecting, from image information obtained through an image pick-up of the object space, an image of a predetermined object and (b) extracting an object feature learning information set representing a feature of the image of the predetermined object; an object feature learning information storing section for storing the object feature learning information set; pick-up candidate image information acquiring means for acquiring a pick-up candidate image, which is a candidate for an image to be picked up; image retrieval processing means for (a) extracting, from the pick-up candidate image acquired, pick-up candidate image feature information sets for respective images of an object in the pick-up candidate image, each of the pick-up candidate image feature information sets representing a feature of one of the images of the object included in the pick-up candidate image, and (b) judging whether or not the pick-up candidate image feature information sets extracted include at least one pick-up candidate image feature information set representing a feature matching with the feature represented by the object feature learning information set stored in advance in the object feature learning information storing section; and image pick-up condition adjusting means for instructing, in a case where the image retrieval processing means determines that the pick-up candidate image feature information sets include at least one pick-up candidate image feature information set representing a feature matching with the feature represented by the object feature learning information set, image pick-up condition optimizing means, which optimizes an image pick-up condition, to cause an object, being included in the pick-up candidate image and corresponding to said at least one pick-up candidate image feature information set, to be subjected to optimization of the image pick-up condition.

In order to solve the foregoing problems, a control method of the present invention is a method of controlling an image pick-up device for an image pick-up of an object space, including the steps of: (i) causing object feature learning means to (a) detect, from image information obtained through an image pick-up of the object space, an image of a predetermined object and (b) extract an object feature learning information set representing a feature of the image of the predetermined object; (ii) causing pick-up candidate image information acquiring means to acquire a pick-up candidate image, which is a candidate for an image to be picked up; (iii) causing image retrieval processing means to (a) extract, from the pick-up candidate image acquired, pick-up candidate image feature information sets for respective images of an object in the pick-up candidate image, each of the pick-up candidate image feature information sets representing a feature of one of the images of the object included in the pick-up candidate image, and (b) judge whether or not the pick-up candidate image feature information sets extracted include at least one pick-up candidate image feature information set representing a feature matching with the feature represented by the object feature learning information set stored in advance in the object feature learning information storing section; and (iv) causing, in a case where the image retrieval processing means determines that the pick-up candidate image feature information sets include at least one pick-up candidate image feature information set representing a feature matching with the feature represented by the object feature learning information set, image pick-up condition adjusting means to instruct image pick-up condition optimizing means, which optimizes an image pick-up condition, to cause an object, being included in the pick-up candidate image and corresponding to said at least one pick-up candidate image feature information set, to be subjected to optimization of the image pick-up condition.

According to this invention, the object feature learning means extracts, from the image information obtained through the image pick-up of the object space, the object feature learning information set, which is information utilized for identification of the certain object, and the object feature learning information set is stored in the object feature learning information storing section. Further, in accordance with (i) the information of the image (pick-up candidate image) which is picked up by the pick-up candidate image information acquiring means and is the candidate for the image to be picked up in the image pick-up and (ii) the object feature learning information set stored in advance in the object feature learning information storing section, the image retrieval processing means judges whether or not an image of an object corresponding to the object learning information set exists in the pick-up candidate image. That is, it is judged whether or not the image of the object, included in the image obtained through the image pick-up carried out in advance, exists in the pick-up candidate image. If the image of the object corresponding to the object learning information exists in the pick-up candidate image, the image pick-up condition optimizing means is instructed to optimize the image pick-up condition for an object corresponding to the image of the object in the pick-up candidate image. Thus, if a pick-up candidate image includes an image of an object included in an image obtained through an image pick-up carried out in advance, optimization of the image pick-up condition is carried out on an object corresponding to the image of the object in the pick-up candidate image.

An object whose image is frequently picked up as an object by a user i.e., an object having a high probability of being desired by a user is subjected to extraction of the object feature learning information set by the object feature learning means, and is stored in the object feature learning information storing section. Therefore, in a case where the image retrieval processing means determines that an image of an object having a high probability of being desired by the user exists in the pick-up candidate image, it is possible to cause said object to be automatically subjected to optimization of the image pick-up condition. Thus, even in the case where a plurality of objects exist, an object having a high probability of being desired by a user can be automatically subjected to optimization of the image pick-up condition. Consequently, even in the case where a plurality of objects exist, it is possible to more easily identify an object desired by a user and cause the object to be subjected to optimization of an image pick-up condition.

Note that the "object space" refers to a space in which the object resides. The "object" may be a person, an animal, a building, a plant, a vehicle, a scene, or a combination of these, and is not particularly limited.

Further, note that the "pick-up candidate image" refers to an image that an image pick-up element included in the image pick-up device temporarily generates for adjustment of the image pick-up condition.

According to the present invention, an object whose image is frequently picked up as an object by a user i.e., an object having a high probability of being desired by a user is subjected to extraction of the object feature learning information set by the object feature learning means, and is stored in the object feature learning information storing section. Therefore, in the case where the image retrieval processing means determines that the image of the object having a high probability of being desired by the user exists in the pick-up candidate image, it is possible to cause said object to be automatically subjected to optimization of the image pick-up condition. Thus, even in the case where a plurality of objects exist, the image pick-up condition adjusting means can instruct the image pick-up condition optimizing means to cause an object having a high probability of being desired by a user to be automatically subjected to optimization of the image pick-up condition. Therefore, even in the case where a plurality of objects exist, it is possible to more easily identify an object desired by a user and cause the object to be subjected to optimization of an image pick-up condition.

BRIEF DESCRIPTION OF DRAWINGS

FIG. 2 is a view illustrating an example of the configuration of a camera section of the image pick-up device.

Figure 3:
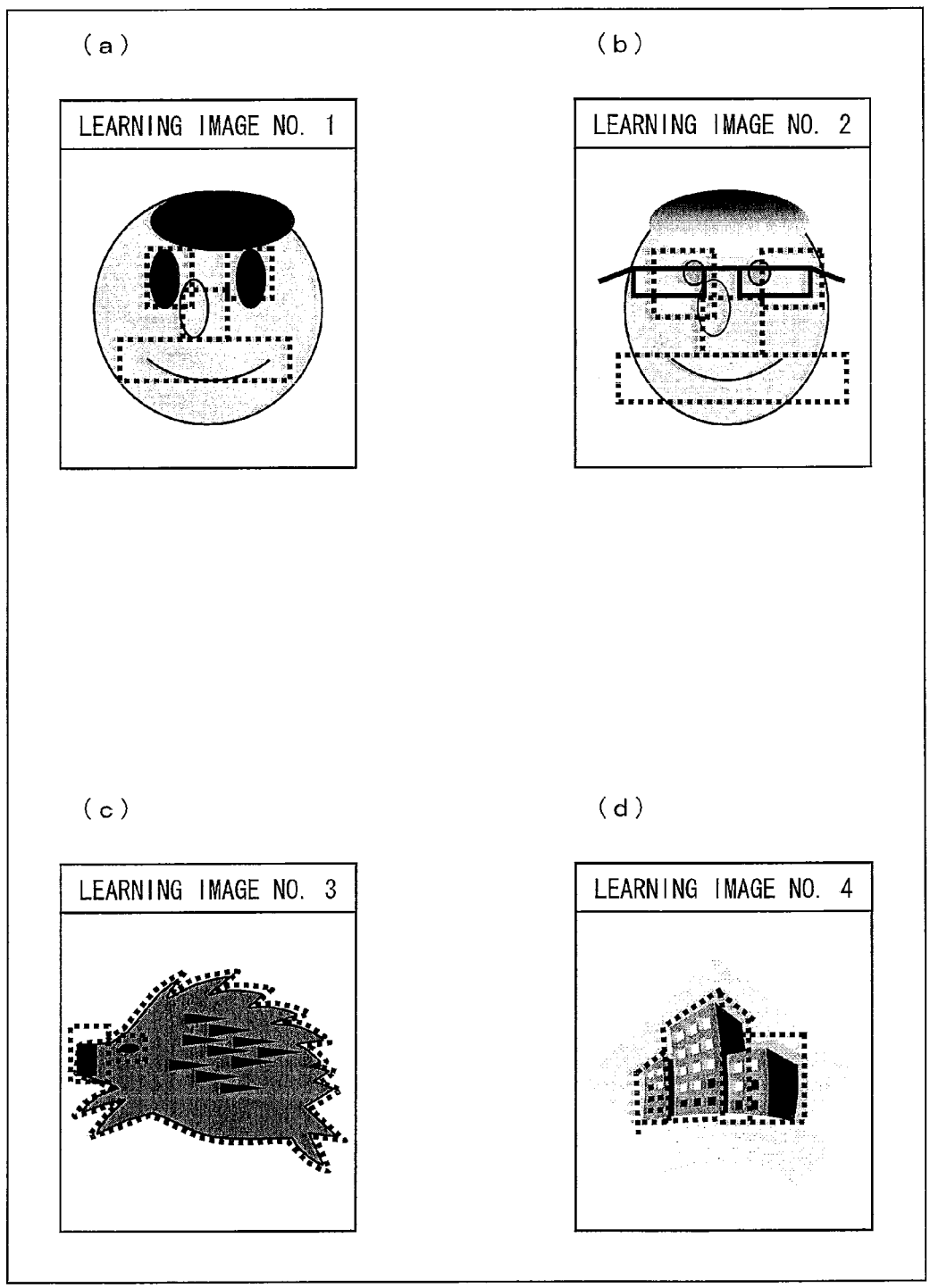
FIG. 3

Each of (a) and (b) of FIG. 3 is a view illustrating an example of features obtained in a case where an object is a person. (c) of FIG. 3 is a view illustrating an example of features obtained in a case where an object is an animal other than a human being. (d) of FIG. 3 is a view illustrating an example of features obtained in a case where an object is a scene.

Figure 4:
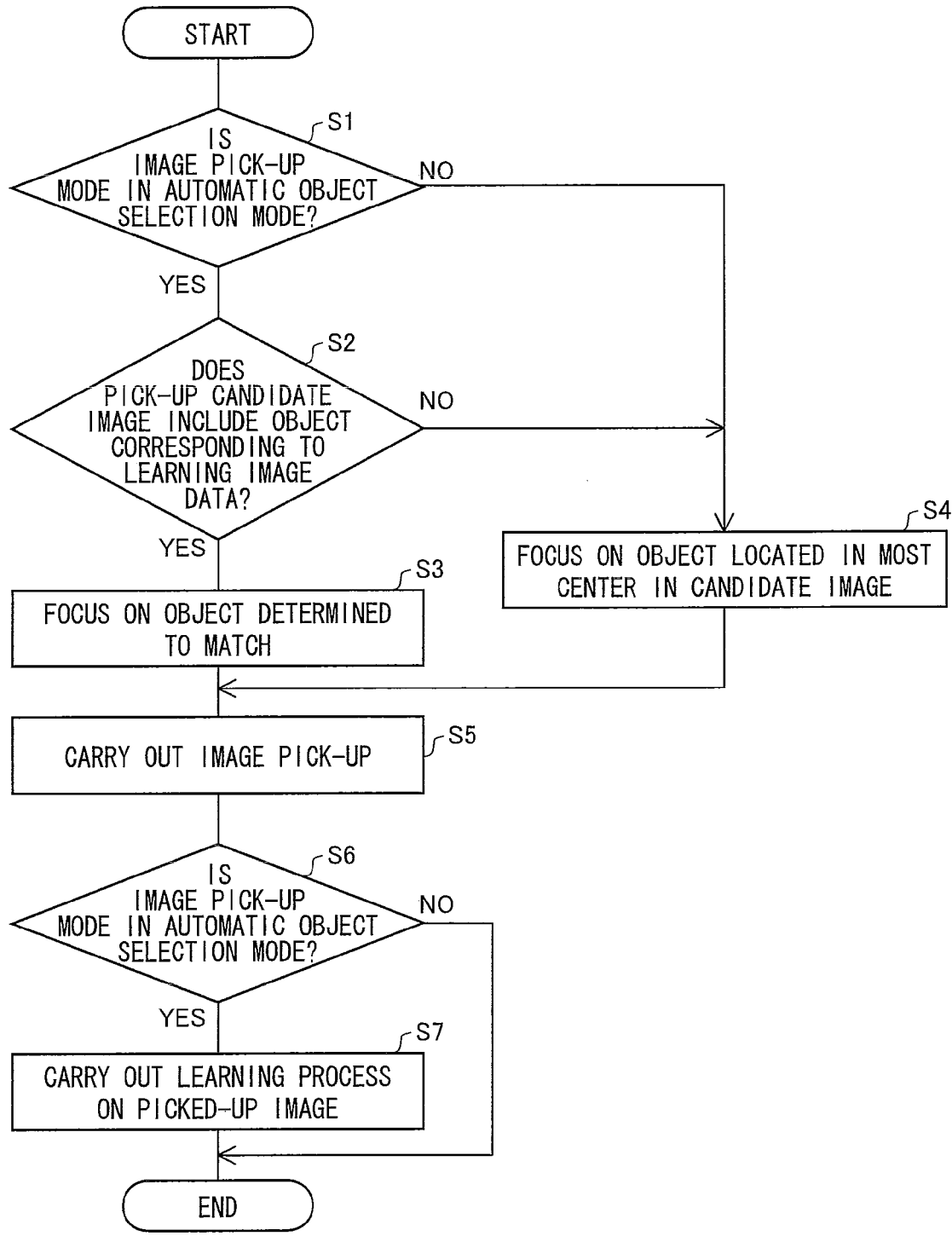

FIG. 4 is a flow chart schematically illustrating an operation flow of the image pick-up device.

Figure 5:
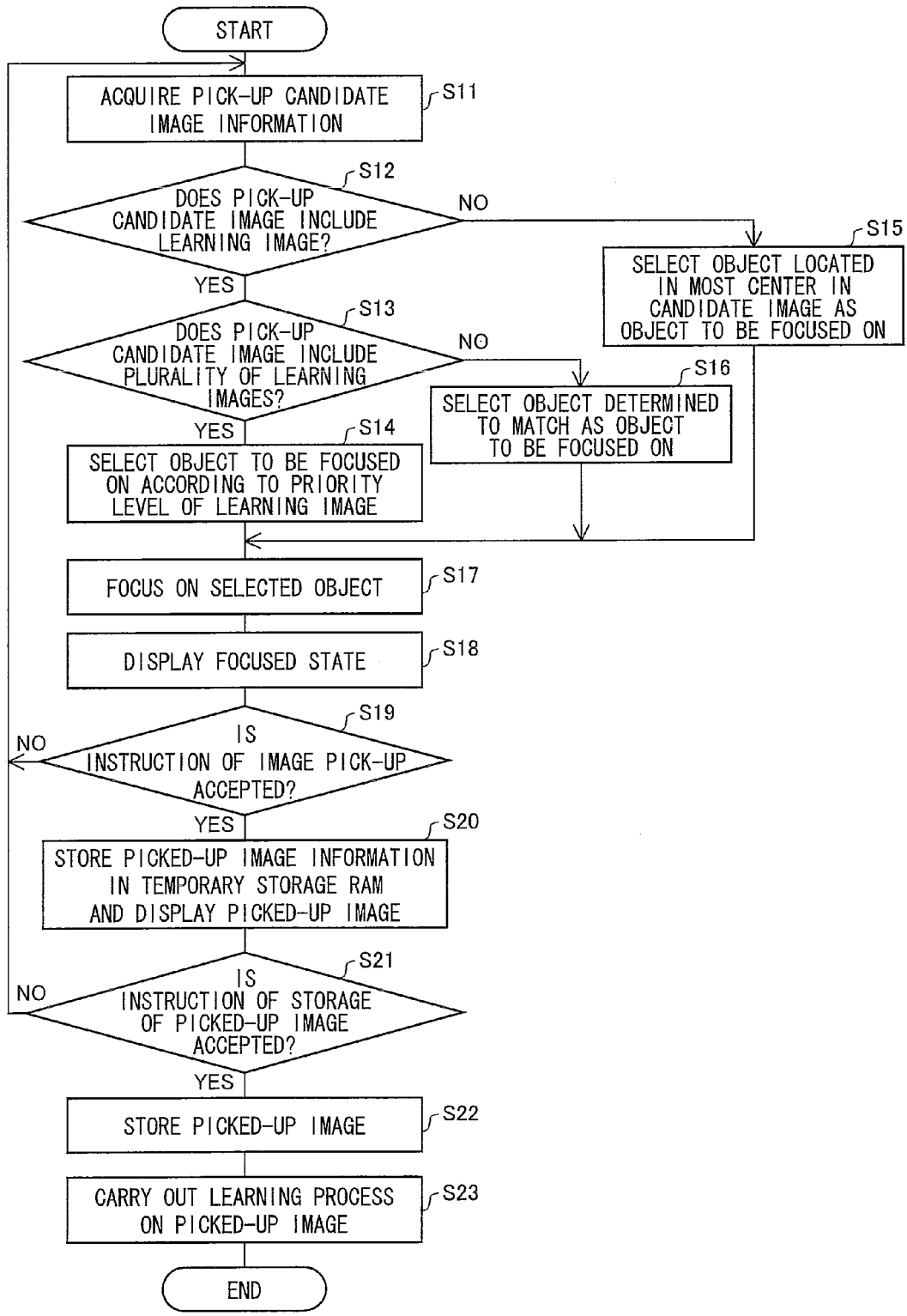

FIG. 5 is a flow chart illustrating the detail of the operation flow of the image pick-up device.

Figure 6:
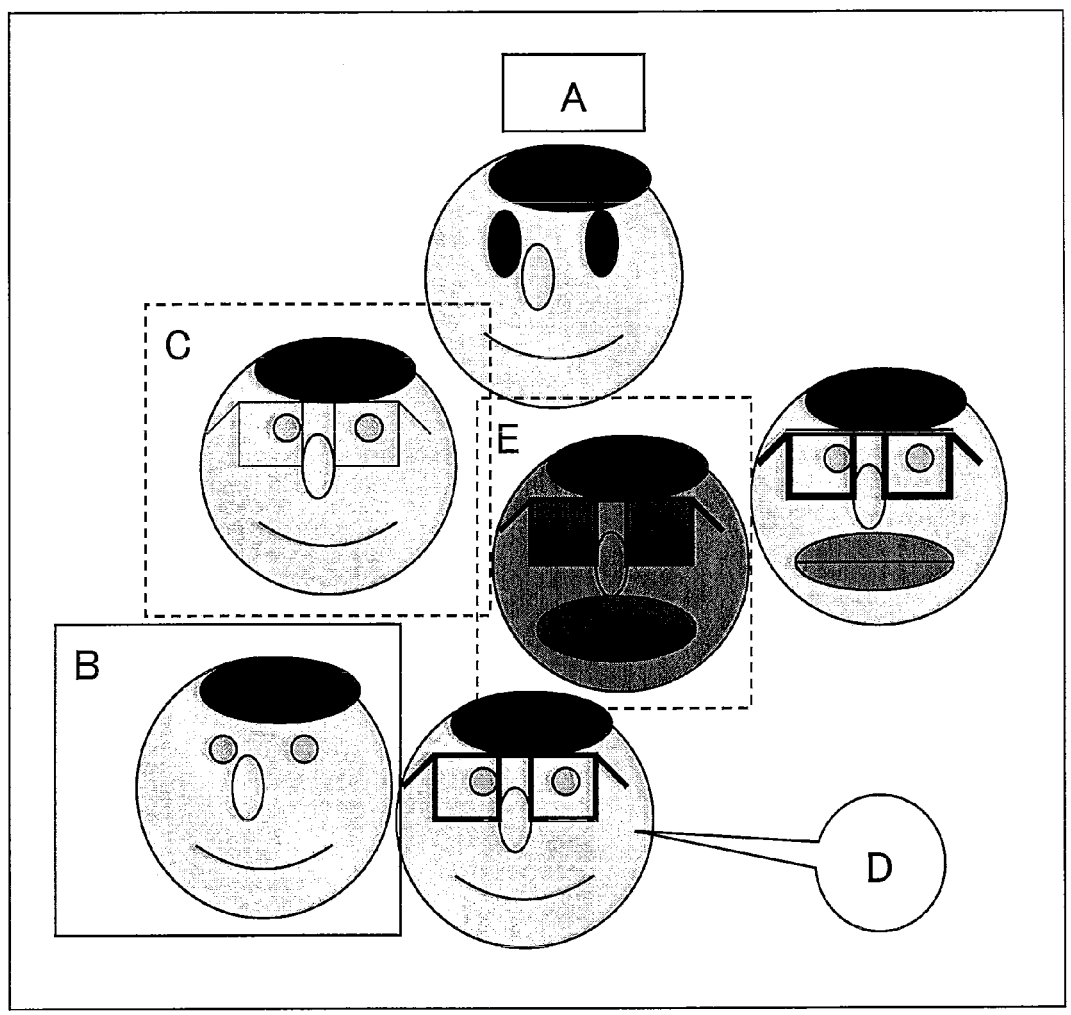

FIG. 6 is a view, related to the present invention, illustrating an example of display in a focused state.

Figure 7:
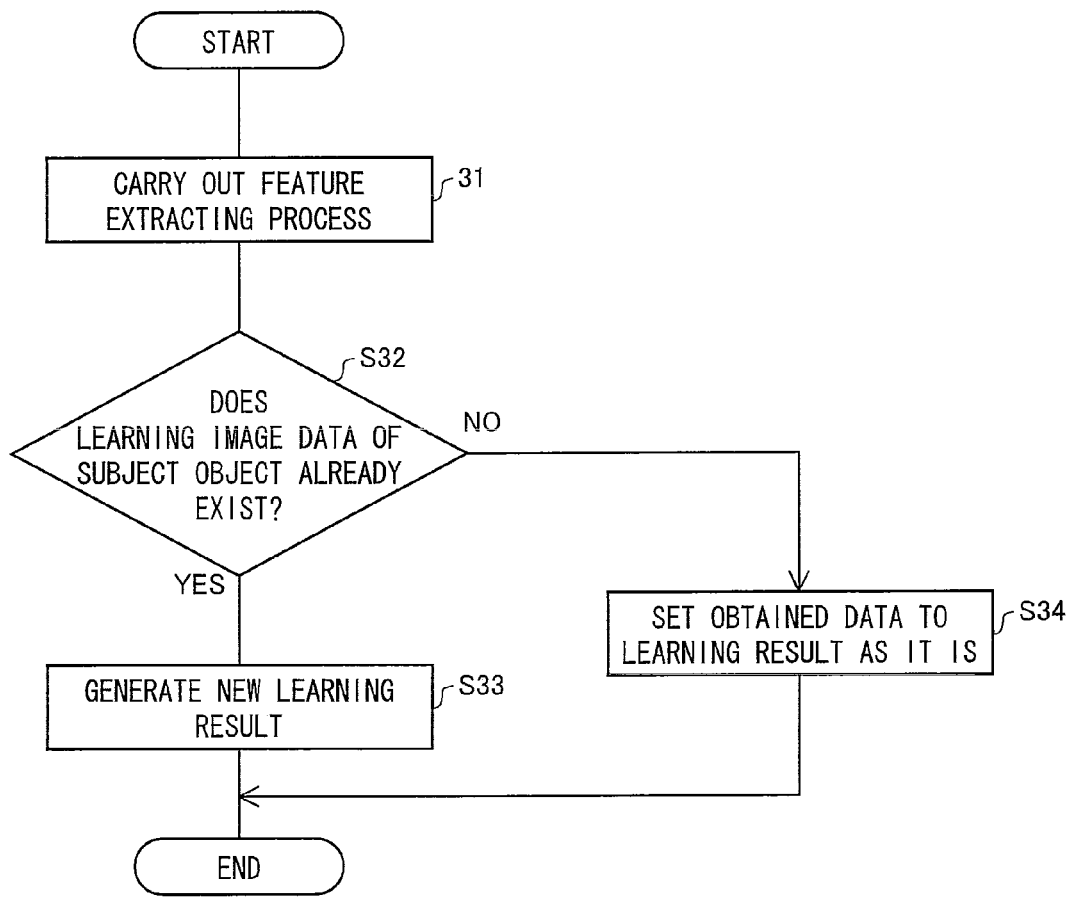

FIG. 7 is a flow chart schematically illustrating a learning process carried out by the image pick-up device.

Figure 8:
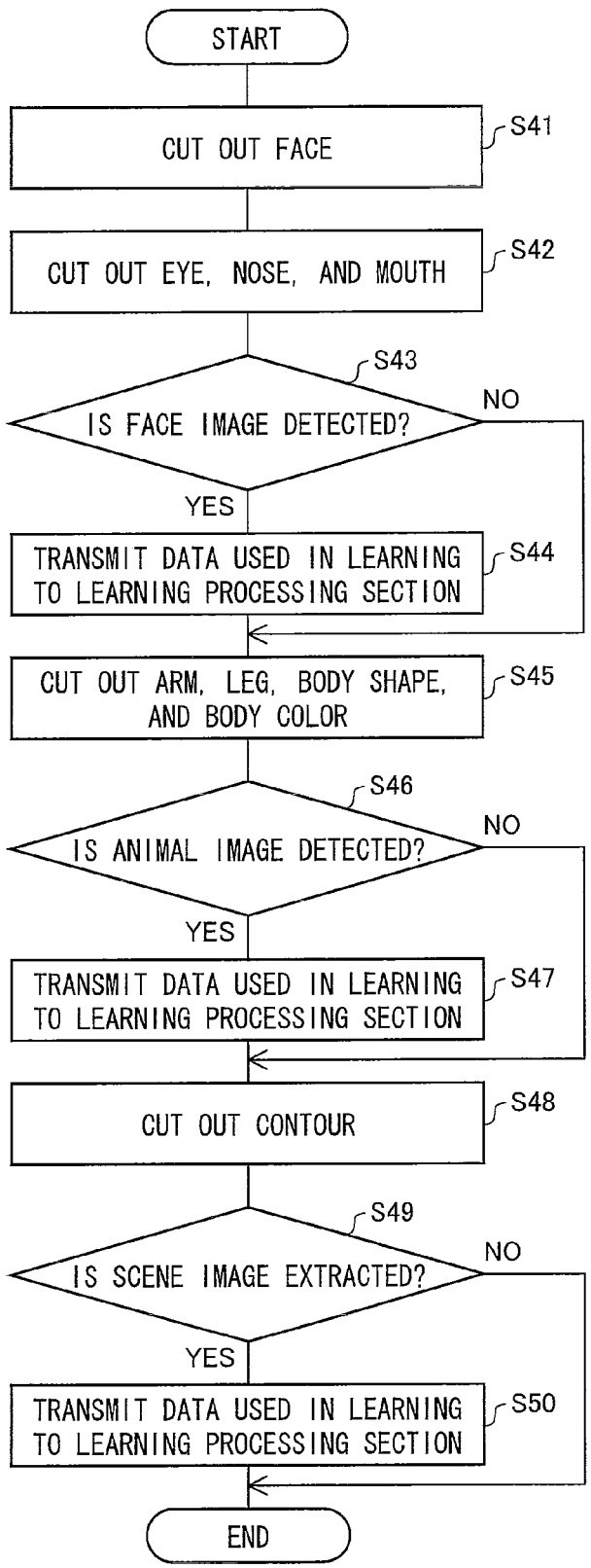

FIG. 8 is a flow chart schematically illustrating a feature extracting process carried out by the image pick-up device.

FIG. 9 is a view, related to the present invention, illustrating an example of phone book data.

Figure 10:
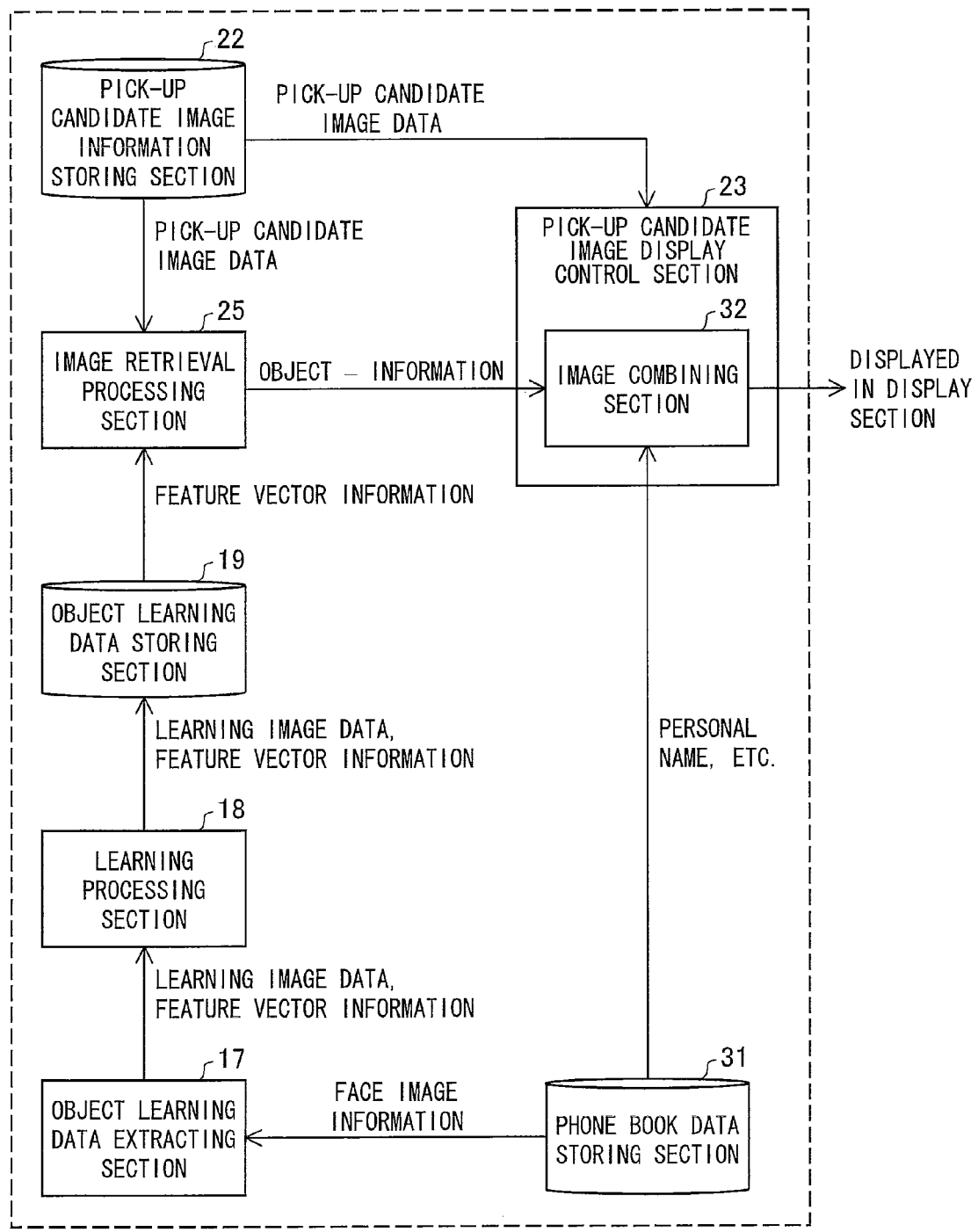

FIG. 10 is a functional block diagram schematically illustrating the configuration of part of the image pick-up device.

FIG. 11

Each of (a) and (b) of FIG. 11 is a view illustrating an example of display observed in a case where a pick-up candidate image is displayed together with personal information of an object.

Figure 12:
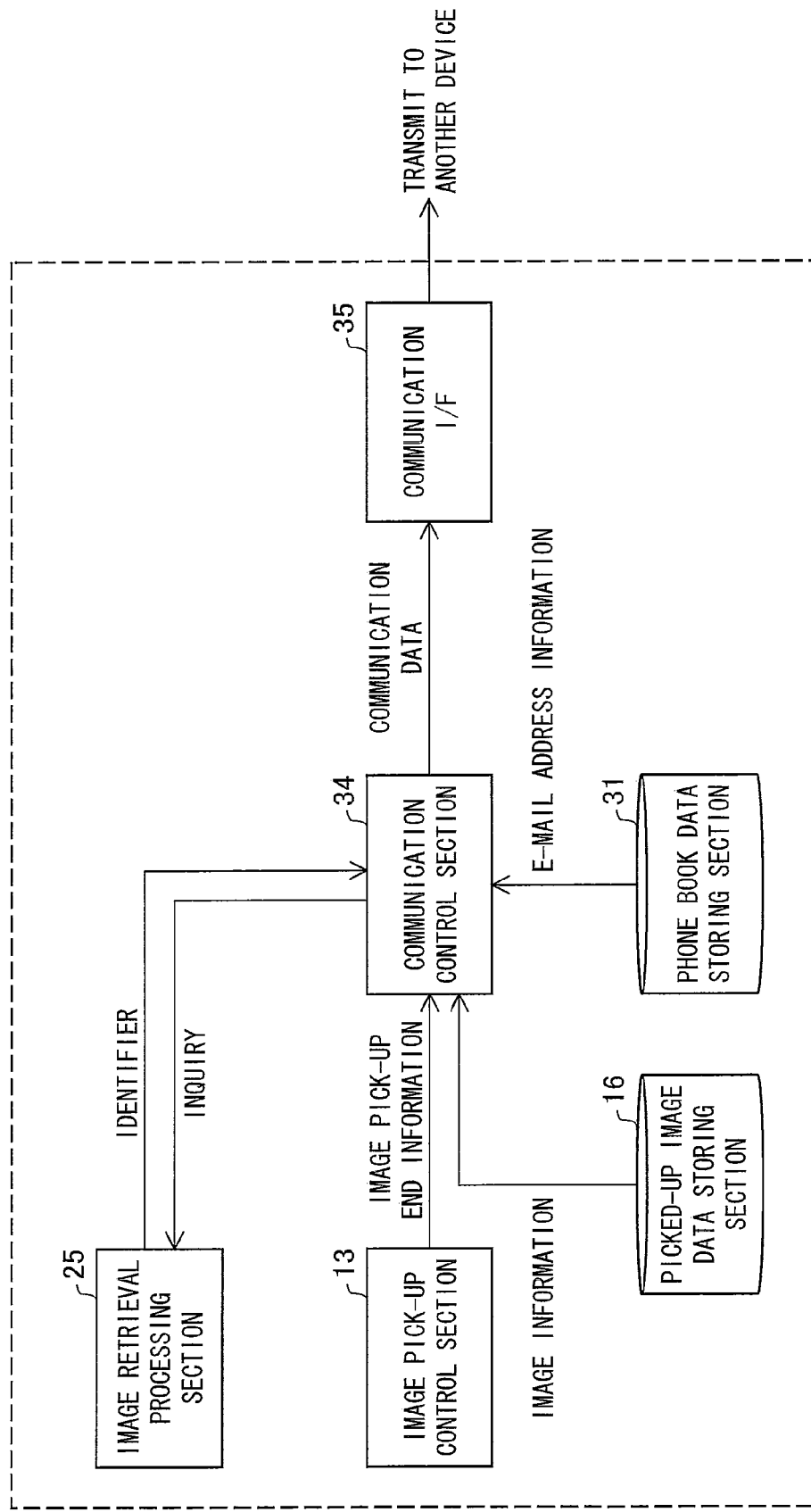

FIG. 12 is a functional block diagram schematically illustrating the configuration of part of the image pick-up device.

REFERENCE SIGNS LIST

1 Image pick-up device
2 Image pick-up condition adjusting device
11 Key input section (Priority level acquiring means)
12 Image pick-up operation detecting section
13 Image pick-up control section
14 Image pick-up section
15 Camera section
16 Picked-up image data storing section
17 Object learning data extracting section (Object feature learning means)
18 Learning processing section (Object feature learning means)
19 Object learning data storing section (Object feature learning information storing section)
20 Priority level assigning section (Priority level information assigning means)
21 Pick-up candidate image information acquiring section (Pick-up candidate image information acquiring means)
22 Pick-up candidate image information storing section
23 Pick-up candidate image display control section (Display Control Means)
24 Display section
25 Image retrieval processing section (Image retrieval processing means)
26 Similarity judging section
27 Priority level judging section
28 Image pick-up condition adjusting section (Image pick-up condition adjusting means)
29 AF control section (Image pick-up condition optimizing means)
30 Mode switching operation detecting section
31 Phone book data storing section (Personal information storing section, Information storing section)
32 Image combining section (Indicating means)
34 Communication control section (Communication control means)
35 Communication I/F
36 History record storing section (History record information storing section)
51 Lens driving section
52 CCD circuit (Image pick-up element)
53 Lens
54 CCD driving section
55 Analog-to-digital converting section

DESCRIPTION OF EMBODIMENTS

One embodiment of the present invention is described below with reference to FIG. 1 to FIG. 12. Note that, in the figures to which are referred in explanations below, the same members and members having the same functions are given the same signs. Therefore, the details of such members will not be repeatedly described.

Figure 1:
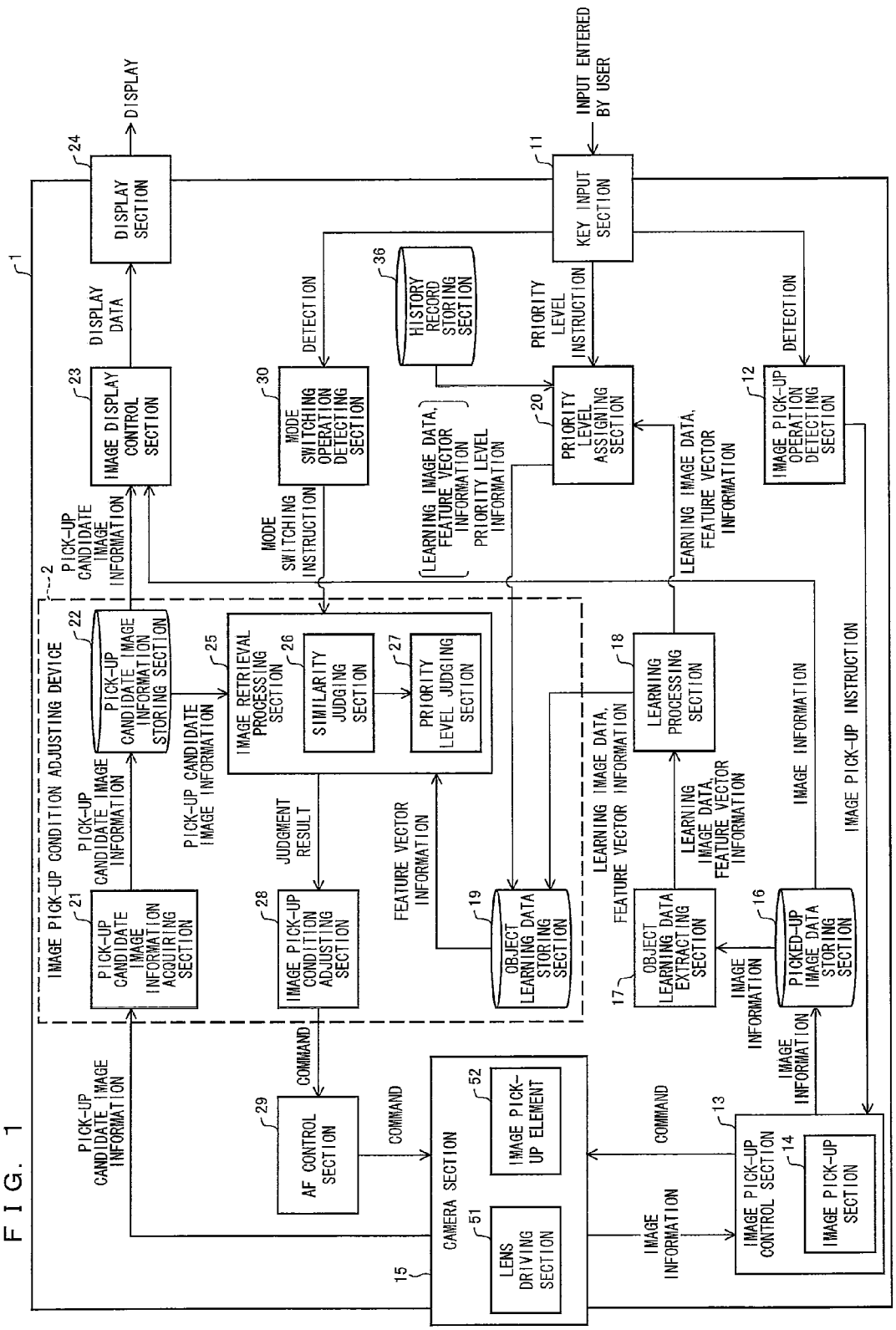
FIG. 1 is a functional block diagram schematically illustrating how an image pick-up device is arranged in the present invention.

Firstly, the configuration of an image pick-up device 1 is schematically described with reference to FIG. 1. FIG. 1 is a functional block diagram schematically illustrating how the image pick-up device 1 is arranged in the present embodiment. As illustrated in FIG. 1, the image pick-up device 1 includes: a key input section 11; an image pick-up operation detecting section 12; an image pick-up control section 13; a camera section 15; a picked-up image data storing section 16; an object learning data extracting section (object feature learning means) 17; a learning processing section (object feature learning means) 18; an object learning data storing section (object feature learning information storing section) 19; a priority level assigning section (priority level information assigning means) 20; a pick-up candidate image information acquiring section (pick-up candidate image information acquiring means) 21; a pick-up candidate image information storing section 22; a pick-up candidate image display control section (display control means) 23; a display section (display means) 24; an image retrieval processing section (image retrieval processing means) 25; an image pick-up condition adjusting section (image pick-up condition adjusting means) 28; an automatic focus (AF) control section (image pick-up condition optimizing means) 29; and a mode switching operation detecting section 30. The image pick-up control section 13 includes an image pick-up section 14. The camera section 15 includes a lens driving section 51 and an image pick-up element 52. The image retrieval processing section 25 includes a similarity judging section 26 and a priority level judging section 27. Note that the object learning data storing section 19, the pick-up candidate image information acquiring section 21, the pick-up candidate image information storing section 22, the image retrieval processing section 25, and the image pick-up condition adjusting section 28 constitute an image pick-up condition adjusting device 2. The present embodiment deals with an example where the image pick-up device 1 is applied to a camera function-equipped mobile phone.

The key input section 11 accepts an instruction entered by a user, and is realized by e.g., various keys and/or buttons or a touch panel provided on the display section 24. The image pick-up operation detecting section 12 detects an instruction, entered via the key input section 11, in which an image pick-up should be carried out, and transmits to the image pick-up control section 13 an instruction (image pick-up instruction) in which the image pick-up control section 13 outputs a command of carrying out an image pick-up. In accordance with the image pick-up instruction received, the image pick-up control section 13 transmits to the image pick-up section 14 a command of a pick-up of image information received from the camera section 15. Then, in response to the command received from the image pick-up control section 13, the image pick-up section 14 stores (picks up), in the picked-up image data storing section 16, the image information received from the image pick-up element 52 in the camera section 15.

Here, the camera section 15 is described in detail with reference to FIG. 2. FIG. 2 is a view illustrating an example of the configuration of the camera section 15. The camera section 15 includes, in addition to the lens driving section 51 and the image pick-up element (CCD circuit) 52 illustrated in FIG. 1, a lens 53, a CCD driving section 54, a signal amplifying section (not illustrated), and an analog-to-digital converting section 55.

Light from an object space is collected in the lens 53, and is caused to enter the image pick-up element 52 for generating an image signal. More specifically, the light collected in the lens 53 forms an image on a light receiving surface, including light receiving elements, of the image pick-up element 52. The light receiving surface of the image pick-up element 52 includes a number of light receiving elements. In each light receiving element, electric charge corresponding to the amount of incident light is accumulated. The electric charge accumulated in a predetermined light exposure period is read from each light receiving element, so that an image signal (image information) is given. The CCD driving section 54 supplies a timing pulse to the image pick-up element 52, so as to carry out timing control by which the electric charge accumulated in each light receiving element until the predetermined light exposure period has elapsed is cleared and read out. Then, the image signal generated in the image pick-up element 52 is amplified by the signal amplifying section, and is converted into a digital signal by the analog-to-digital converting section 55. Subsequently, the digital signal is transmitted to the image pick-up control section 13 and the pick-up candidate image information acquiring section 21 (described later).

The lens driving section 51 causes the lens 53 to move in an optical axis direction, in response to a lens driving command received from the AF control section 29 (described later). That is, the lens driving section 51 drives the lens 53, so that a focal length of the camera section 15 varies.

In storing a moving image (moving image information) in the picked-up image data storing section 16 as image information, the image pick-up section 14 stores, in the picked-up image data storing section 16, moving image information in which audio information outputted from a microphone (not illustrated) is associated with image information. That is, storage of a still image in the picked-up image data storing section 16 is carried out in such a manner that the image pick-up section 14 stores merely image information, whereas storage of moving image information in the picked-up image data storing section 16 is carried out in such a manner that the image pick-up section 14 associates image information with audio information so as to create and store moving image information. Further, the following configuration is also possible: After an image pick-up, an image corresponding to image information obtained through the image pick-up is displayed by the display section 24. Furthermore, the following configuration is also possible: The picked-up image data storing section 16 is a temporary storage RAM, the display section 24 displays an image corresponding to image information obtained through an image pick-up, and the image information is stored in another memory in a case where the key input section 11 accepts an instruction, entered by a user, that requires storage of the image. Here, "another memory" may be the one provided for a server connected with the image pick-up device 1 via a network, or a recording medium which is attachable to/detachable from the image pick-up device 1.

The object learning data extracting section 17 extracts, from image information obtained through an image pick-up (i.e., information of a picked-up image, image information obtained through an image pick-up of an object space), an image region (learning image data) corresponding to an object. The object learning data extracting section 17 extracts a feature of the image region corresponding to the object, vectorizes the extracted feature of the image region corresponding to the object (i.e., creates a feature vector (object feature learning information set)), and transmits to the learning processing section 18 (i) the information of the feature vector by which the object can be identified and (ii) the image data (learning image data) of the object. A process for extracting from the image information the object and the feature of the object may be a publicly-known one for extracting, from image information, a luminance distribution, a color signal level distribution, and the like so that an object is recognized based on the distributions. For example, in a case where the object is a person, it is possible to recognize the person (the face of the person) by detecting, based on the distributions, a skin color region and a feature such as an eye, a nose, and/or a mouth in the image. Note that, in the present embodiment, the object to be recognized is not necessarily limited to a person. Instead, it is also possible to recognize, as the object, an animal other than a human being, a building, a scene (e.g., a mountain), or the like by detecting a feature corresponding to each of them. Here, the "feature vector" is a vectorized collection of numeric values representing a feature of an image or a graphic.

Here, with reference to (a) to (d) of FIG. 3, features for use in recognition of an object are described. Each of (a) and (b) of FIG. 3 is a view illustrating one example of features obtained in a case where the object is a person. (c) of FIG. 3 is a view illustrating one example of features obtained in a case where the object is an animal other than a human being. (d) of FIG. 3 is a view illustrating one example of features obtained in a case where the object is a scene.

In the case where the object is a person, as illustrated in each of (a) and (b) of FIG. 3, eyes, a nose, and a mouth surrounded by the respective dotted line frames are determined as features, for example. In this way, it is possible to recognize a certain person. In the case where the object is an animal other than a human being, as illustrated in (c) of FIG. 3, an eye, a tusk, and a body shape surrounded by the respective dotted line frames are determined as features, for example. In this way, it is possible to recognize a certain animal. In the case where the object is a scene, as illustrated in (d) of FIG. 3, a contour surrounded by the dotted line frame is determined as a feature, for example. In this way, it is possible to recognize a scene such as architecture (e.g., a certain building or house) or mountain.

The learning processing section 18 associates (i) information of a feature vector by which an object can be identified with (ii) learning image data of the object, each of which is received from the object learning data extracting section 17, and stores them as a learning result (object feature learning information set) in the object learning data storing section 19. In a case where information of a feature vector and learning image data of the object are stored in the object learning data storing section 19 in advance, the learning processing section 18 may not store a new learning result, or may increase the weight of priority level information of the learning result stored in advance. Further, in the present embodiment, a new learning result may be stored in addition to the learning result stored in advance, and a retrieval (described later) may be carried out in order from a newest learning result. It is preferable that the new learning result is obtained in such a manner that a higher priority is placed on newer data. This makes it possible to obtain a learning result representing an object picked up most recently. Furthermore, in the present embodiment, the learning process carried out by the object learning data extracting section 17 and the learning processing section 18 may utilize a publicly-known process used in pattern recognition. The object learning data storing section 19 stores the information of the feature vector and the learning image data of the object associated with each other.

The learning processing section 18 may carry out learning on all objects that the object learning data extracting section 17 has extracted as an object, or may carry out learning on part of the objects. For example, in the case where learning is carried out on part of the objects, the display section 24 displays respective images of the objects in accordance with the learning image data, so as to make a user select, out of the objects displayed, an object to be subjected to learning.

The priority level assigning section 20 assigns a focusing priority level to an object whose learning image data is stored in the object learning data storing section 19. In other words, the priority level assigning section 20 assigns, to learning image data of the object, information indicative of a priority level which is utilized for judgment of whether or not the object represented by the learning image data is to be focused on. For example, the priority level assigning section 20 may cause the display section 24 to display images of objects in accordance with the learning image data, may accept an instruction indicative of a priority degree as an object to be focused on, which instruction is entered by a user via the key input section (priority level acquiring means) 11, and may assign, to learning image data corresponding to the object, a weight (information indicative of a priority level) determined based on the instruction indicative of the priority degree. As another example, the priority level assigning section 20 may obtain from the learning processing section 18 information indicative of the number of learning carried out on each certain object, and gives information indicative of a higher priority level to learning image data corresponding to an object on which a larger number of learning has been carried out.

Note that the priority level assigning section 20 may assign a priority level to a feature vector corresponding to the learning image data.

The pick-up candidate image information acquiring section 21 acquires image information (pick-up candidate image information) transmitted from the camera section 15, and stores it in the pick-up candidate image information storing section 22. The pick-up candidate image information storing section 22 is a temporary storage RAM that temporarily stores pick-up candidate image information received from the pick-up candidate image information acquiring section 21. The pick-up candidate image display control section 23 reads out the pick-up candidate image information from the pick-up candidate image information storing section 22 in order, and causes the display section 24 to display the pick-up candidate image information.

The "pick-up candidate image information" refers to an image that the image pick-up element 52 included in the image pick-up device 1 temporarily generates for adjustment of an image pick-up condition, which is adjusted to obtain image information (picked-up image) to be stored in the picked-up image data storing section 16, and that is stored in the pick-up candidate image information storing section 22, which is for temporary storage.

The image retrieval processing section 25 carries out the judgment (retrieval) of whether or not a feature of an object corresponding to learning image data stored in the object learning data storing section 19 matches with a feature of an object extracted from pick-up candidate image information stored in the pick-up candidate image information storing section 22. More specifically, the image retrieval processing section 25 extracts, from the pick-up candidate image, pick-up candidate image feature information sets for respective images of an object in the pick-up candidate image, each of the pick-up candidate image feature information sets representing a feature of one of the images of the object included in the pick-up candidate image. Then, the image retrieval processing section 25 judges whether or not the pick-up candidate image feature information sets extracted include a pick-up candidate image feature information set representing a feature matching with the feature represented by the object feature learning information set (e.g., a feature vector associated with the learning image data) stored in advance in the object feature learning information storing section.

In a case where the image retrieval processing section 25 judges that there are a plurality of objects whose features match with features of objects stored in the object learning data storing section 19, the image retrieval processing section 25 selects an object having a higher priority level assigned to the object learning data, as an object to be subjected to optimization of the image pick-up condition. For example, the above-mentioned judgment may be carried out in the following manner: A part including a feature(s) of the object is extracted from the pick-up candidate image information, and the feature(s) is/are vectorized, so that the value of a feature vector is calculated. Then, a similarity between the value of this feature vector and the value of the feature vector corresponding to the learning image data is calculated. If the similarity exceeds a predetermined value, it is determined that the feature of the object extracted from the pick-up candidate image information matches with the feature of the object corresponding to the learning image data.

Specifically, the similarity judging section 26 in the image retrieval processing section 25 calculates the value of the feature vector of the object extracted from the pick-up candidate image information, and calculates the similarity between the calculated value of the feature vector and the value of the feature vector corresponding to the learning image data, so as to obtain the similarity between the feature vectors. If the similarity exceeds a predetermined value, the similarity judging section 26 determines that the feature of the object extracted from the pick-up candidate image information matches with the feature of the object corresponding to the learning image data. Note that the predetermined value herein can be arbitrarily set. Further, instead of the above-mentioned method, the process for calculating a similarity between images may adopt a calculating method of an image similarity calculating system as disclosed in Patent Literature 8, for example.

In the case where there are a plurality of objects, extracted from pick-up candidate image information, whose features are determined to match with features of respective objects corresponding to learning image data, the priority level judging section 27 in the image retrieval processing section 25 selects an object to be focused on, in accordance with the priority level information assigned to the learning image data. Then, the priority level judging section 27 transmits, to the image pick-up condition adjusting section 28, information of the selected object (e.g., information indicative of where in the pick-up candidate image the selected object is located).

In a case where there is one object, extracted from pick-up candidate image information, whose feature is determined to match with a feature of an object corresponding to learning image data, the image retrieval processing section 25 transmits, to the image pick-up condition adjusting section 28, information concerning the object determined to match. In a case where there is no object, extracted from pick-up candidate image information, whose feature is determined to match with a feature of an object corresponding to learning image data, the image retrieval processing section 25 transmits, to the image pick-up condition adjusting section 28, information concerning an object located in the most center of the pick-up candidate image.

The image pick-up condition adjusting section 28 transmits, to the AF control section 29, a command that requires an object identified by the judgment result received from the image retrieval processing section 25 to be focused on (i.e., a command that requires optimization of the image pick-up condition for the object). Specifically, in accordance with the information concerning the object (e.g., the information indicative of where in the pick-up candidate image the object is located), transmitted from the image retrieval processing section 25, the image pick-up condition adjusting section 28 transmits a command to the AF control section 29, which command requires the AF control section 29 to give an instruction of focusing on the object.

For example, in a case where the similarity judging section 26 determines that features of objects extracted from pick-up candidate image information include a feature matching with a feature represented by a feature vector corresponding to learning image data, the image pick-up condition adjusting section 28 instructs the AF control section 29 to cause the object, being in the pick-up candidate image and having the feature determined to match, to be subjected to optimization of the image pick-up condition.

The AF control section 29 carries out a process for focusing the camera section 15 in accordance with image information received from the image pick-up element 52 in the camera section 15. Specifically, the AF control section 29 determines an optimum focal length with respect to an object identified by a command received from the image pick-up condition adjusting section 28. At this time, the optimum focal length is determined based on a variation in the image information occurring when the focal length is varied.

The mode switching operation detecting section 30 detects that the key input section 11 has accepted an instruction entered that requires an image pick-up mode to be switched between an automatic object selection mode and a normal mode, and transmits, to the image retrieval processing section 25, an instruction (mode switching instruction) that requires switching of the image pick-up mode. The "automatic object selection mode" herein refers to a mode in which an object to be focused on is selected by the image pick-up condition adjusting section 28 in accordance with a judgment result given by the image retrieval processing section 25. The "normal mode" refers to a mode in which the image retrieval processing section 25 transmits to the AF control section 29 a command that requires an object located in the most center of the pick-up candidate image to be focused on. Instead of this, for example, the normal mode may be such that the display section 24 is caused to display a frame and an object located inside the frame is focused on.

Next, an operation flow of the image pick-up device 1 is described with reference to FIG. 4 and FIG. 5. FIG. 4 is a flow chart schematically illustrating the operation flow of the image pick-up device 1. FIG. 5 is a flow chart illustrating the detail of the operation flow of the image pick-up device 1.

Firstly, the operation flow of the image pick-up device 1 is schematically described with reference to FIG. 4. In step S1, if the mode switching operation detecting section 30 detects that the image pick-up mode is in the automatic object selection mode (Yes in step S1), the procedure proceeds to step S2. If the mode switching operation detecting section 30 detects that the image pick-up mode is in the normal mode (No in step S1), the procedure proceeds to step S4.

In step S2, the image retrieval processing section 25 carries out the judgment (retrieval) of whether or not features of objects extracted from the pick-up candidate image information includes any feature matching with a feature of an object corresponding to learning image data stored in the object learning data storing section 19 (i.e., whether or not a pick-up candidate image includes an image of an object corresponding to learning image data). If the pick-up candidate image includes an image of an object corresponding to learning image data (Yes in step S2), the procedure proceeds to step S3. If the pick-up candidate image does not include an image of an object corresponding to learning image data (No in step S2), the procedure proceeds to step S4.

In step S3, the image retrieval processing section 25 selects an object to be focused on. After that, the AF control section 29 causes the selected object to be focused on, and then the procedure proceeds to step S5. In step S4, the AF control section 29 causes an object located in the most center of the candidate image to be focused on, and then the procedure proceeds to step S5. In step S5, the image pick-up section 14 carries out an image pick-up. Then, the procedure proceeds to step S6.

In step S6, if the mode switching operation detecting section 30 detects that the image pick-up mode is in the automatic object selection mode (Yes in step S6), the procedure proceeds to step S7. If the mode switching operation detecting section 30 detects that the image pick-up mode is in the normal mode (No in step S6), the flow is ended. In step S7, the object learning data extracting section 17 and the learning processing section 18 carry out the learning process. Then, the flow is ended.

Described so far in the present embodiment is such the configuration that the mode switching operation detecting section 30 switches the image pick-up mode between the automatic object selection mode and the normal mode. However, the present invention is not necessarily limited to this. Instead of this, for example, a mode (manual mode) allowing a user to manually adjust the focal length may be additionally selectable.

Next, the operation flow of the image pick-up device 1 is described in detail with reference to FIG. 5. Described herein deals with an example where the automatic object selection mode is selected.

Firstly, in step S11, the pick-up candidate image information acquiring section 21 acquires image information (pick-up candidate image information) transmitted from the camera section 15. Then, the procedure proceeds to step S12.

In step S12, the similarity judging section 26 included in the image retrieval processing section 25 carries out the judgment of whether or not a feature of an object corresponding to learning image data stored in the object learning data storing section 19 matches with a feature of an object extracted from the pick-up candidate image information (i.e., whether or not a pick-up candidate image includes a learning image). If it is determined that there is an object, extracted from the pick-up candidate image information, whose feature matches with a feature of an object corresponding to learning image data (Yes in step 12), the procedure proceeds to step S13. If it is determined that there is no object, extracted from the pick-up candidate image information, whose feature matches with a feature of any of the objects corresponding to the learning image data (No in step 12), the procedure proceeds to step S15. Note that, in step S12, all learning image data stored in the object learning data storing section 19 are subjected to the judgment of whether or not the feature of each learning image data matches with the feature of any of the objects extracted from the pick-up candidate image information, so that it is determined whether or not the pick-up candidate image includes the object corresponding to the learning object.

Subsequently, in step S13, if there are a plurality of objects, extracted from the pick-up candidate image information, whose features match with features of respective ones of the objects corresponding to the learning image data (i.e., if the similarity judging section 26 determines that the pick-up candidate image includes a plurality of features matching with features of learning images) (Yes in step S13), the procedure proceeds to step S14. If there is one object, extracted from the pick-up candidate image information, whose feature matches with a feature of an object corresponding to learning image data (No in step S13), the procedure proceeds to step S16.

In step S14, the priority level judging section 27 in the image retrieval processing section 25 selects a learning image in accordance with information indicative of a priority level assigned to the learning image data (i.e., in accordance with a priority level of the learning image data), so as to select an object to be focused on, and then the procedure proceeds to step S17. For example, the priority level judging section 27 selects one object corresponding to a learning image having a highest priority level, from among the plurality of learning images found in the pick-up candidate image.

In step S15, the image retrieval processing section 25 selects, as an object to be focused on, an object located in the most center of the pick-up candidate image. Then, the procedure proceeds to step S17. In step S16, the image retrieval processing section 25 selects, as an object to be focused on, the object determined to match with the object corresponding to the learning image data. Then, the procedure proceeds to step S17.

In step S17, the AF control section 29 causes the selected object to be focused on. Then, the procedure proceeds to step S18. In step S18, a candidate image in which the selected object is focused on is displayed by the display section 24 (i.e., a focused state is displayed). Then, the procedure proceeds to step S19.

In step S19, if the image pick-up operation detecting section 12 detects acceptance of an instruction entered that requires an image pick-up and the image pick-up section 14 carries out the image pick-up (Yes in step S19), the procedure transfers to step S20. If the image pick-up section 14 does not carry out the image pick-up (No in step S19), the procedure returns to step S11 so that the flow is repeated. In the present embodiment, in a case where an image pick-up is not carried out by the image pick-up section 14 within a predetermined period, it is determined that the image pick-up section 14 does not carry out the image pick-up. The "predetermined period" herein can be arbitrarily set.

In step S20, image information (information of a picked-up image) received from the image pick-up element 52 in the camera section 15 is stored in the picked-up image data storing section 16, and the picked-up image is displayed by the display section 24. Then, the procedure proceeds to step S21. In step S21, if the key input section 11 accepts an instruction, entered by a user, that requires storage of the picked-up image (Yes in step S21), the procedure proceeds to step S22. If the key input section 11 does not accept, an instruction, entered by a user, that requires storage of the picked-up image (No in step S21), the picked-up image is not stored in another memory, and the procedure returns to step S11 so that the flow is repeated. In the present embodiment, in a case where the instruction that requires storage of the picked-up image is not entered within a predetermined period, it is determined that the key input section 11 does not accept an instruction, entered by a user, that requires storage of the picked-up image. The "predetermined period" herein can be arbitrarily set.

In step S22, the picked-up image is stored (retained) in another memory. Then, the procedure proceeds to the step S23. In step S23, the object learning data extracting section 17 and the learning processing section 18 carry out the learning process. Then, the flow is ended.

Described in the present embodiment is the configuration that, in the case of "No" in step S19 or step S21, the procedure returns to step S11 so that the flow is repeated. However, the present invention is not necessarily limited to this. Instead of this, for example, the flow may be ended in such the case.

Further, described in the present embodiment is the configuration that the priority level judging section 27 selects, in step S14, one object to be focused on, in accordance with the priority level of the learning image. However, the present invention is not necessarily limited to this. Instead of this, for example, all objects which are included in pick-up candidate images and whose corresponding learning images exist may be displayed together with information (e.g., numbers) indicative of priority levels so that an object to be focused on is selected by a user. Further, instead of this, with respect to all objects in the pick-up candidate images, information indicative that an object given the information is selectable may be transferred one from another in the order of decreasing priority, so that an object to be focused on is selected by the user. Examples of the information indicative that the object given the information is selectable encompass: a frame surrounding the object; a symbol indicated for the object at a predetermined position; or frames of different colors surrounding the respective objects, the colors differing depending on their priority levels.

Here, an example of a display in a focused state is described with reference to FIG. 6. FIG. 6 is a view illustrating an example of a display in a focused state. As illustrated in FIG. 6, for example, the display in the focused state may be as follows: a focused object is provided with, at a position in a space around the focused object (e.g., above the focused object), an indication indicative that the object is focused on (Example A); a focused object is surrounded by a solid line frame (Example B); a focused object is surrounded by a dotted line frame (Example C); a focused object is provided with a speech balloon (Example D); or a color tone of a focused object is changed (Example E). As another example, focused regions may be surrounded by respective frames of different colors, which differ depending on their propriety levels.

Further, in the present embodiment, in the case where there are a plurality of objects, extracted from pick-up candidate image information, whose features match with features of respective ones of objects corresponding to learning image data, the indications for the respective objects may be changed as illustrated in FIG. 6, in accordance with the respective priority levels so that an object to be focused on is selected by the user, or the images of the subject objects may be displayed one by one in order so that an object to be focused on is selected by the user. In this case, information (e.g., a number) indicative of the priority level may be displayed together with the image of the object.

Next, the learning process carried out by the image pick-up device 1 is described with reference to FIG. 7. FIG. 7 is a flow chart schematically illustrating the learning process carried out by the image pick-up device 1.

Firstly, in step S31, the object learning data extracting section 17 detects an object from information of a picked-up image (picked-up image information), and carries out a feature extracting process for extracting a feature from an image of the object. Subsequently, in step S32, if learning image data for the image of the detected object is already stored in the object learning data storing section 19 (if learning image data for the subject object already exists) (Yes in step S32), the procedure proceeds to step S33. If learning image data for the detected object is not stored in the object learning data storing section 19 (No in step S32), the procedure proceeds to step S34.

For example, in step S32, the judgment of whether or not the learning image data for the detected object is already stored in the object learning data storing section 19 may be carried out in such a manner that the learning processing section 18 compares (i) a feature vector corresponding to the learning image data for the detected object with (ii) each feature vector stored in the object learning data storing section 19 so as to determine whether or not the feature vector for the detected object matches with any of the feature vectors stored in the object learning data storing section 19.

In step S33, the learning processing section 18 increases the weight of priority level, indicative of a priority degree, of the object feature learning information set (the learning image data or the feature vector), so as to generate a new learning result (object feature learning information set) and store it in the object learning data storing section 19 (i.e., generate a new learning result). Then, the flow is ended. In step S34, the learning processing section 18 associates (i) the information of the feature vector from which the object can be identified with (ii) the learning image data for the object, each received from the object learning data extracting section 17, and then stores them as a learning result in the object learning data storing section 19 (i.e., the data obtained is set as a learning result as it is). Then, the flow is ended.

In order that an image of an object to be subjected to extraction of a feature is identified, the pick-up candidate image display control section 23 may cause the display section 24 to display the image of the object. Further, the learning processing section 18 may acquire an instruction as to whether to store, in the object learning data storing section 19, (i) learning image data and (ii) information of a feature vector each of which is of the image of the object that the pick-up candidate image display control section 23 has caused the display section 24 to display.

Next, the feature extracting process carried out by the image pick-up device 1 is described with reference to FIG. 8. FIG. 8 is a flow chart schematically illustrating the feature extracting process carried out by the image pick-up device 1.

Firstly, in step S41, the object learning data extracting section 17 extracts the data of a face region (i.e., cuts out a face) from the picked-up image information. Subsequently, in step S42, a feature(s) such as an eye, a nose, and/or a mouth is/are extracted (an eye, a nose, and/or a mouth is/are cut out). In step S43, if the face of a person is detected in the picked-up image (i.e., a face image is detected) as a result of the cutting-out of the face and the cutting-out of the eye, the nose, and/or the mouth (Yes in step S43), the procedure proceeds to step S44. If a face image is not detected (No in step S43), the procedure proceeds to step S45.

In step S44, the image data of the detected face and information of a feature vector calculated from the feature are transmitted to the learning processing section 18 as data for use in the learning. Then, the procedure proceeds to step S45. If a plurality of faces are detected, the image data of each detected face and information of a feature vector calculated from the feature of each detected face are transmitted to the learning processing section 18 (i.e., learning is carried out). In the present embodiment, learning may be carried out only on a picked-up image for which the image pick-up condition has been optimized.

Subsequently, in step S45, a feature(s) such as the number of arms and legs, the positions of an arm and a leg, a body shape, and/or a body color is/are extracted (i.e., an arm, a leg, a body shape, and/or a body color is/are cut out). In step S46, if an animal other than a human being is detected in the picked-up image (i.e., an image of an animal is detected) as the result of the cutting out of the arm, the leg, the body shape, and/or the body color (Yes in step S46), the procedure proceeds to step S47. If an image of an animal is not detected (No in step S46), the procedure proceeds to step S48. In step S47, the image data of the detected animal and information of a feature vector calculated from the feature are transmitted to the learning processing section 18 as data for use in learning. Then, the procedure proceeds to step S48. If a plurality of animals are detected, the image data of each detected animal and information of a feature vector worked out from the feature of each detected animal are transmitted to the learning processing section 18.

In step S48, a feature such as a contour is extracted (i.e., a contour is cut out). In step S49, if a scene such as a building is detected in the picked-up image (i.e., a scene is detected) as the result of the cutting out of the contour (Yes in step S49), the procedure proceeds to step S50. If a scene image is not detected (No in step S49), the flow is ended. In step S50, the image data of the detected scene and information of a feature vector calculated from the feature are transmitted to the learning processing section 18 as data for use in learning. Then, the flow is ended. If a plurality of buildings and/or the like are detected as the scene, the image data of each detected scene and information of a feature vector calculated from the feature of each detected scene are transmitted to the learning processing section 18.

The detection of the face image, the detection of the animal image, the detection of the scene image described above may be carried out with use of a publicly-known pattern recognition method.

The example described in the present embodiment is the case where the image pick-up device 1 is applied to the camera function-equipped mobile phone. However, the present invention is not necessarily limited to this. For example, the image pick-up device 1 may be applied to a digital camera, a video camera, or a camera function-equipped portable information terminal device (portable communication device) which is not the camera function-equipped mobile phone.

In a case where the image pick-up device 1 is applied to e.g., a camera function-equipped mobile phone capable of transmission/reception of an e-mail, the object learning data extracting section 17 and the learning processing section 18 may obtain, from image data attached to an e-mail, learning image data and information of a feature vector, and the learning image data and the information of the feature vector may be stored in the object learning data storing section 19. With this configuration, the image data attached to the e-mail can be used for learning.

Next, the following describes an example of a variation of the image pick-up device 1. An image pick-up device 1 according to the variation is applied to e.g., a camera function-equipped mobile phone capable of transmission/reception of an e-mail, a phone call, and the like. Further, as illustrated in FIG. 9, an e-mail address, a phone number, and the like of a person are associated with the face image data of the person in the image pick-up device 1.

Firstly, with reference to FIG. 10, the following describes an example of a configuration that, in a case where a pick-up candidate image includes an object whose face image data is registered in phone book data, the object is displayed together with the object's personal information registered in the phone book data. FIG. 10 is a functional block diagram schematically illustrating the configuration of part of the image pick-up device 1.

A phone book data storing section (personal information storing section, information storing section) 31 associates (i) information registered as phone book data with (ii) learning image data for an object corresponding to this information (or information of a feature vector corresponding to the learning image data), and stores them. Examples of the information registered as the phone book data encompass, as illustrated in FIG. 9, a name, a phone number, an e-mail address, and a face image each of which is of a certain person. The above-mentioned information is associated with a respective person, and is stored (registered) as the phone book data. Further, other examples of the information registered as the phone book data encompass: an address; a birthday; an individually assigned number (e.g., a phone book memory number); group identification information indicative of a group to which an object belongs in a case where objects are classified into groups; information of a character such as Chara-den (Registered Trademark) which is set in place of the image of the object; the image of the object (registered image); and thumbnail information including these. The information of the face image registered as the phone book data may be derived from an image picked up by the image pick-up device 1, or may be derived from an image obtained by one which is not the image pick-up device 1. Further, for example, the information of the face image registered as the phone book data may be derived from an image attached to an e-mail, an image in a home page (HP) in a website, or a screenshot obtained from digital broadcasting.

In the present embodiment, the object learning data storing section 19 may store a learning result obtained with respect to an image which has been stored in advance in a certain folder for storing images to be subjected to learning.

In this example, the object learning data extracting section 17 generates, from the information of the face image received from the phone book data storing section 31, information of a feature vector by which the face image (object) can be identified, and transmits (i) the information of the feature vector generated and (ii) the information of the face image (the image data of the object (learning image data)) to the learning processing section 18.

The learning processing section 18 associates (i) the information of the feature vector by which the object can be identified with (ii) the image data of the object (learning image data), each received from the object learning data extracting section 17, and stores them as a learning result in the object learning data storing section 19. In this example, in the case where the phone book data storing section 31 transmits information of the face image to the object learning data extracting section 17, the information of the face image may be given e.g., an identifier by which phone book data corresponding to the information of the face image can be identified so that the identifier is also given to learning image data to be stored in the object learning data storing section 19.

The image retrieval processing section 25 judges whether or not (i) a feature of an object corresponding to learning image data stored in the object learning data storing section 19 matches with (ii) a feature of an object extracted from pick-up candidate image information stored in the pick-up candidate image information storing section 22. If it is determined that there is an object, extracted from the pick-up candidate image information, whose feature matches with the feature of the object corresponding to the learning image data stored in the object learning data storing section 19, the image retrieval processing section 25 selects the object as an object to be focused on. Then, the image retrieval processing section 25 transmits, to the image pick-up condition adjusting section 28, the information of the selected object. Further, the image retrieval processing section 25 transmits, to an image combining section 32, (i) information (object position information) indicative of where in the pick-up candidate image the object is located and (ii) an identifier of the learning image data corresponding to the object (i.e., the learning image data associated with the feature vector representing the feature matching with the feature of the object extracted from the pick-up candidate image information).

In accordance with the identifier, received from the image retrieval processing section 25, of the learning image data corresponding to the object, the image combining section (indicating means) 32 reads out predetermined personal information (e.g., a personal name) from the phone book data storing section 31. Further, in accordance with (i) the information indicative of where in the pick-up candidate image the object is located and (ii) the personal information read out, the image combining section 32 combines, at a predetermined position, the personal information (e.g., the personal name) with the image of the subject object in the pick-up candidate image. Then, the display section 24 displays the pick-up candidate image combined with the personal information. For example, the pick-up candidate image combined with the personal information may be displayed such that, as illustrated in (a) of FIG. 11, the name of the subject object is indicated below the image of the subject object.

The configuration described so far in the present embodiment deals with a case where an image of an object in a pick-up candidate image matches with an image of an object corresponding to learning image data in one-to-one relationship. However, the present invention is not necessarily limited to this. For example, in a case where a pick-up candidate image includes a plurality of images of objects similar to an image of a certain object corresponding to learning image data, the image of the object may be displayed together with information (e.g., different types of frames, or numbers) indicative of similarity ranking, in addition to personal information (e.g., personal name) displayed at a predetermined position. Specifically, as illustrated in (b) of FIG. 11, a personal name may be indicated below an image of a subject object, and the type of a frame surrounding the personal name may be changed depending on the similarity. Note that, in addition to the personal name displayed below the image of the subject object, a number indicative of similarity ranking may be displayed.

In a case where the similarity judging section 26 determines that a plurality of feature vectors, extracted from pick-up candidate image information, include a plurality of feature vectors matching with feature vectors extracted from a plurality of learning image data, the display section 24 may indicate personal information of respective objects corresponding to the plurality of learning image data. At this time, the display section 24 may display (i) personal information of an object which has been subjected to optimization of the image pick-up condition by the AF control section 29 and (ii) personal information of an object which has not been subjected to optimization of the image pick-up condition by the AF control section 29 in different styles.

Specifically, although names of all objects whose learning image data are stored are displayed at the point of the image pick-up, (i) a name of an object which has been subjected to optimization of the image pick-up condition and (ii) a name of another object which has not been subjected to optimization of the image pick-up condition are displayed in different styles (e.g., in different colors or different character sizes).

With this configuration, even in a case where there are a plurality of objects each having a possibility to be subjected to optimization of the image pick-up condition, a user can easily recognize, via the display section 24, an object which has been subjected to optimization of the image pick-up condition.

In the foregoing explanation, an identifier is given to learning image data. However, instead of this, an identifier may be given to information of a feature vector associated with learning image data, or may be given to both of learning image data and information of a feature vector. Any configuration is possible as far as it allows an image of an object in a pick-up candidate image to be associated with personal information of the object.

The above-mentioned configuration makes it possible to display, in a space around an image of an object in focus, a personal name and/or the like of the object. This allows a user (a person carrying out an image pick-up) to identify the object in focus, thereby reducing occurrence of user's mistake causing out-of-focus.

Next, with reference to FIG. 12, the following describes an example of a configuration that, in a case where a picked-up image includes an image of an object whose face image data is registered in phone book data, the data of the picked-up image is transmitted to the object in accordance with the object's e-mail address registered in the phone book data. FIG. 12 is a functional block diagram schematically illustrating the configuration of part of the image pick-up device 1.

In this example, firstly, when the image pick-up section 14 completes an image pick-up, the image pick-up control section 13 transmits, to a communication control section 34 (described later), information (image pick-up end information) indicative that the image pick-up has ended. Then, the image retrieval processing section 25 selects an object to be focused on. In a case where learning image data corresponding to the selected object is provided with an identifier (an identifier by which phone book data corresponding to the information of the face image can be identified), the image retrieval processing section 25 retains the identifier until completion of a process for selecting another object to be focused on next.

Upon receipt of the image pick-up end information transmitted from the image pick-up control section 13, the communication control section (communication control means) 34 inquires of the image retrieval processing section 25 whether or not the identifier is retained in the image retrieval processing section 25. In a case where the identifier is retained in the image retrieval processing section 25 (in other words, in a case where the image retrieval processing section 25 determines that information of an e-mail address of the object having been subjected to optimization of the image pick-up condition is stored in the phone book data storing section 31), the communication control section 34 reads out, from the phone book data storing section 31, the information of the e-mail address in the phone book data corresponding to the identifier, in accordance with the information of the identifier. Further, upon receipt of the image pick-up end information transmitted from the image pick-up control section 13, the communication control section 34 reads out, from the picked-up image data storing section 16, image information obtained through the image pick-up. Then, based on the image information read out and the information of the e-mail address read out, the communication control section 34 creates communication data for transmitting the image information to a device having the e-mail address, and transmits the communication data to a communication interface (I/F) 35 (described later). The communication I/F 35 transmits, to the device having the e-mail address, the communication data received from the communication control section 34.

With this configuration, in the case where a picked-up image includes an image of an object whose face image data is registered in phone book data, the communication control section 34 can read out the object's e-mail address registered in the phone book data, and can transmit the image information to a device having the e-mail address. That is, the data of the picked-up image including the object (image information) can be transmitted to the object.

In the present embodiment, in a case where phone book data includes a priority level set to each person, the priority level assigning section 20 may assign a priority level to learning image data corresponding to each person, in accordance with the priority level in the phone book data.

In a case where the data of a picked-up image is transmitted, via the communication I/F 35, to a printer or the like which is provided outside the image pick-up device 1 so that the picked-up image is printed on a post card by the printer or the like, the foregoing configuration for associating data of a picked-up image with phone book data may be utilized. That is, in this case, information of an address may be read out from the phone book data associated with the data of the picked-up image, so that the object's name and address are automatically filled by the printer.

In the present embodiment, in the case where a picked-up image includes an image of an object whose face image data is registered in phone book data, information indicative of a priority level may be given to the learning image data in accordance with (a) the number of received e-mails or received phone calls or (b) the number of sent e-mails or dialed phone calls.

In order to achieve this, in a case where learning has been carried out on an object and the face image data of the object has been registered in phone book data, the priority level assigning section 20 obtains, from a history record storing section (history record information storing section) 36 (see FIG. 1) which associates (i) information (history record number information) including (a) the number of received e-mails or received phone calls or (b) the number of sent e-mails or dialed phone calls with (ii) the learning image data (or information of a feature vector corresponding to the learning image data) and stores them, communication history record information with respect to the object. Then, in accordance with the communication history record information obtained, the priority level assigning section 20 gives information indicative of a priority level to the learning image data corresponding to the object.

In other words, the history record storing section 36 stores the history record number information with regard to the object corresponding to the learning image data (or the information of the feature vector) stored in the object learning data storing section 19. In accordance with the history record number information, the priority level assigning section 20 gives the priority level information to the learning image data (or the information of the feature vector) associated with the history record number information.

For example, a higher priority level may be given to learning image data associated with history record information indicative of a greater sum of all of the number of received e-mails, the number of received phone calls, the number of sent e-mails, and the number of dialed phone calls. Instead of this, a higher priority level may be given to learning image data associated with history record information indicative of a greater sum of the number of received e-mails and the number of received phone calls only or a greater sum of the number of sent e-mails and the number of dialed phone calls only. Further, instead of this, a higher priority level may be given to learning image data associated with history record information indicative of a greater sum of any of the number of received e-mails, the number of received phone calls, the number of sent e-mails, and the number of dialed phone calls.

The priority level assigning section 20 may lower, as time elapses, a priority level indicated by priority level information given to learning image data. With this configuration, it is possible to preferentially set, as an object to be subjected to optimization of the image pick-up condition, an object corresponding to learning image data associated with a newer history record of a sent e-mail, a dialed phone call, a received e-mail, or a received phone call.

The judgment of whether or not face image data of an object is registered in phone book data may be carried out with use of the foregoing identifier. Further, an identifier by which an object can be identified may be given also to communication history record information stored in the history record storing section. With this, in the case where learning has been carried out on an object and face image data of the object have been registered in phone book data, the priority level assigning section 20 can obtain communication history record information with regard to the object.

This configuration makes it possible to preferentially focus on a person having a closer relationship with a user, i.e., a person frequently communicating with a user by e-mail and/or phone, for example. Further, a higher priority level may be given to a person associated with at least either one of history record information indicative of a greater number of sent e-mails and history record information indicative of a greater number of dialed phone calls. This makes it possible to preferentially focus on a person whom the user frequently contacts i.e., a person having an especially close relationship with the user.

The image pick-up device 1 described so far in the present embodiment includes, as illustrated in FIG. 10 and FIG. 12, the phone book data storing section 31, the image combining section 32, the communication control section 34, the communication I/F 35, and the like. However, in a case where the image pick-up device 1 is applied to a device which does not require a function(s) for communication by e-mail and/or phone, for example, the image pick-up device 1 may not include the phone book data storing section 31, the image combining section 32, the communication control section 34, the communication I/F 35, and/or the like.

Further, even in the case where the image pick-up device 1 is applied to a device not equipped with a function(s) for communication by e-mail and/or phone, for example, the image pick-up device 1 may be provided with the phone book data storing section 31 and/or the foregoing history record storing section 36, may obtain phone book data and/or communication history record information from a device outside the image pick-up device 1 via wireless or wired communication, and may store the phone book data and/or the communication history record information in the phone book data storing section 31 and/or the foregoing history record storing section 36, respectively, so as to utilize the phone book data and/or the communication history record information. With this, the image pick-up device 1 can provide the effects described above.

In the present embodiment, in a case where an object to be subjected to optimization of the image pick-up condition is selected by a user via the key input section 11, for example, the selected object may be determined as the object to be subjected to optimization of the image pick-up condition, in accordance with the selection of the user, even if the selected object is not one of the objects whose learning image data are stored in the object learning data storing section 19.

The configuration described so far in the present embodiment is such that the image retrieval processing section 25 commands the AF control section 29 to cause a desired object to be subjected to optimization of focusing among image pick-up conditions. However, the present invention is not necessarily limited to this. For example, the image retrieval processing section 25 may command a light section (not illustrated) serving as a light exposure device to cause a desired object to be subjected to optimization of brightness (light exposure) among the image pick-up conditions. In this case, the image retrieval processing section 25 selects an object to be subjected to optimization of brightness, instead of an object to be focused on. Further, a command may be given to a member(s) controlling e.g., an aperture and/or a shutter speed so that a desired object is subjected to optimization of brightness (exposure) among the image pick-up conditions. Furthermore, a command may be given to various members related to the image pick-up conditions so that an objected is subjected to optimization of a white balance, a color tone, a film sensitivity, and/or the like. Moreover, a combination of these is also possible.

In other words, the "image pick-up conditions" may include at least one of a focus, exposure, light exposure, a white balance, a color tone, a shutter speed, a film sensitivity, and an aperture.

This makes it possible to carry out an image pick-up by more easily identifying an object desired by a user and causing the object to be subjected to optimization of at least one of a focus, exposure, light exposure, a white balance, a color tone, a shutter speed, a film sensitivity, and an aperture.

Lastly, the blocks of the image pick-up device 1 may be realized by way of hardware or software as executed by a CPU as follows:

The image pick-up device 1 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The object of the present invention can also be achieved by mounting to the image pick-up device 1 a computer readable recording medium containing control program code (executable program, intermediate code program, or source program) for the image pick-up device 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The image pick-up device 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer signal embedded in a carrier wave in which the program code is embodied electronically.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

As described above, it is preferable that an image pick-up device according to the present invention further includes: priority level information assigning means for assigning, in a case where the object feature learning information storing section stores a plurality of object feature learning information sets, to at least one of the plurality of object feature learning information sets priority level information indicative of having priority over other one(s) of the plurality of object feature learning information sets.

According to this, the priority level information assigning means assigns, to at least one of the plurality of object feature learning information sets stored in the object feature learning information storing section, the priority level information indicative of having priority over other one(s) of the plurality of object feature learning information sets. Therefore, even in a case where a pick-up candidate image includes a plurality of images of objects corresponding to respective object feature learning information sets, it is possible to select, by means of the image retrieval processing means, an object to be subjected to optimization of the image pick-up condition, in accordance with the priority level information assigned to the object feature learning information set(s).

Further, it is preferable that the image pick-up device according to the present invention further includes: history record information storing section for storing, with regard to an object corresponding to at least one of the plurality of object feature learning information sets stored in the object feature learning information storing section, history record number information containing at least one of the number of sent e-mails, the number of received e-mails, the number of dialed phone calls, and the number of received phone calls, the priority level information assigning means assigning, in accordance with the history record number information, the priority level information to said at least one of the plurality of object feature learning information sets related to the history record number information.

According to this, the priority level information assigning means assigns, in accordance with the history record number information, the priority level information to the object feature learning information set corresponding to the history record number information containing at least one of the number of sent e-mails, the number of received e-mails, the number of dialed phone calls, and the number of received phone calls, with regard to the object corresponding to the object feature learning information set stored in the object feature learning information storing section. Therefore, even in a case where a pick-up candidate image includes a plurality of images of objects corresponding to respective object feature learning information sets, it is possible to select, by means of the image retrieval processing means, an object to be subjected to optimization of the image pick-up condition, based on the priority level information which is assigned to the object feature learning information set(s) in accordance with the history record number information. In view of this, for example, the priority level assigning means' assigning the priority level information so that a higher priority level is given to an object feature learning information set associated with history record number information indicative of at least one of a greater number of sent e-mails, a greater number of received e-mails, a greater number of dialed phone calls, a greater number of received phone calls, and a greater sum of these numbers makes it possible to preferentially cause an object who frequently communicates with a user e.g., by e-mail and/or phone to be subjected to optimization of the image pick-up condition.

Furthermore, it is preferable that the image pick-up device according to the present invention further includes: priority level acquiring means for accepting a priority level entered by a user with respect to at least one of the plurality of object feature learning information sets, the priority level information assigning means assigning the priority level information in accordance with the priority level that the priority level acquiring means has accepted.

According to this, the priority level information assigning means assigns the priority level information in accordance with the priority level, entered by the user, that the priority level acquiring means has accepted. Therefore, even in a case where a pick-up candidate image includes a plurality of images of objects corresponding to respective object feature learning information sets, it is possible to select, by means of the image retrieval processing means, an object to be subjected to optimization of the image pick-up condition, based on the priority level information which is assigned to the object feature learning information set(s) in accordance with the user's input of the priority degree. Thus, it is possible to more appropriately cause an object desired by a user to be subjected to optimization of an image pick-up condition.

Moreover, in the image pick-up device according to the present invention, it is preferable that, in a case where the image retrieval processing means determines that the pick-up candidate image feature information sets include a plurality of pick-up candidate image feature information sets representing features matching with features represented by respective ones of the plurality of object feature learning information sets, the image retrieval processing means selects one of the respective ones of the plurality of object feature learning information sets, in accordance with the priority level information assigned to said at least one of the plurality of object feature learning information sets, so as to select an object to be subjected to optimization of the image pick-up condition.

With this, even in a case where a pick-up candidate image includes a plurality of images of objects corresponding to respective object feature learning information sets, it is possible to select, by means of the image retrieval processing means, an object to be subjected to optimization of the image pick-up condition, based on the priority level information which is assigned to the object feature learning information set(s).

Furthermore, it is preferable that the image pick-up device according to the present invention further includes: a personal information storing section for storing, with regard to the object corresponding to the object feature learning information set stored in the object feature learning information storing section, personal information including at least one of: (i) a name; (ii) an e-mail address; (iii) a phone number; (iv) an address; (v) a birthday; (vi) an individually assigned number; (vii) group identification information indicative of a group to which the object belongs in a case where the respective objects are classified into groups; (viii) information of a character to be set in place of the image of the object; (ix) the image of the object; and (x) thumbnail information containing two or more of the (i) through (ix); and indicating means for creating and indicating, in a case where the image retrieval processing means determines that a feature of an object corresponding to personal information stored in the personal information storing section matches with a feature represented by one of the pick-up candidate image feature information sets, an image which indicates at least one of the (i) through (x) of the personal information related to the object having the feature represented by said one of the pick-up candidate image feature information sets.

According to this, if the image retrieval processing means determines that the pick-up candidate image includes an image of an object which corresponds to the object feature learning information set stored in the object feature learning information storing section and whose personal information is stored in the personal information storing section, the personal information including at least one of: (i) a name; (ii) e-mail address; (iii) a phone number, (iv) an address; (v) a birthday; (vi) an individually assigned number; (vii) group identification information indicative of a group to which the object belongs in a case where the respective objects are classified into groups; (viii) information of a character to be set in place of the image of the object; (ix) the image of the object; and (x) thumbnail information containing two or more of the (i) through (ix), the indicating means creates and indicates an image indicating the personal information of the object. Thus, it is possible to display the personal information for the object which has been subjected to optimization of the image pick-up condition. Further, since the personal information can be displayed for the object which has been subjected to optimization of the image pick-up condition, the user can easily identify the object which has been subjected to optimization of the image pick-up condition.

Moreover, it is preferable that the image pick-up device according to the present invention further includes: an information storing section for storing information including at least an e-mail address of the object corresponding to the object feature learning information set stored in the object feature learning information storing section; and communication control means for transmitting, in a case where (a) an image pick-up is carried out after optimization of the image pick-up condition and (b) information of an object that has been subjected to the optimization of the image pick-up condition is stored in the information storing section, image information obtained through the image pick-up to a terminal having the e-mail address related to the object.

According to this, in the case where (a) the image pick-up is carried out after optimization of the image pick-up condition is carried out on the object corresponding to the object feature learning information set stored in the object feature learning information storing section and whose information containing at least the e-mail address is stored in the information storing section and (b) the image retrieval processing means determines that the image of said object exists in the pick-up candidate image, the communication control means transmits, to the terminal having the e-mail address associated with the object, the image information obtained through the image pick-up. Thus, in the case where a picked-up image includes an image of an object whose information containing at least an e-mail address is stored in the information storing section, it is possible to transmit the data of the picked-up image to the object.

Furthermore, it is preferable that the image pick-up device according to the present invention further includes display control means for causing display means to display an image of an object which is to be subjected to extraction of the object feature learning information set so that the image of the object is identified, the object feature learning means acquiring an instruction as to whether to store, in the object feature learning information storing section, the object feature learning information set of the image of the object which the display control means causes the display means to display.

This makes it possible for the user to recognize the image of the object which is to be subjected to extraction of the object feature learning information, and makes it possible to obtain from the user an instruction as to whether to store the object feature learning information set of the object in the object feature learning information storing section. Therefore, it is possible to obtain an object feature learning information set which is desired by the user, and not to obtain an object feature learning information set which is not desired by the user.

Moreover, in the image pick-up device according to the present invention, it is preferable that the priority level information assigning means lowers, as time elapses, the priority level indicated by the priority level information assigned to said at least one of the plurality of object feature learning information sets.

With this, it is possible to preferentially set, as an object to be subjected to optimization of the image pick-up condition, an object corresponding to a newer object feature learning information set.

Furthermore, in the image pick-up device according to the present invention, it is preferable that: in a case where the pick-up candidate image feature information sets include a plurality of pick-up candidate image feature information sets representing features matching with features represented by a plurality of object feature learning information sets, the indicating means indicates personal information related to an object(s) corresponding to the plurality of object feature learning information sets; and the indicating means indicates the personal information related to the object(s) corresponding to the plurality of object feature learning information sets such that (a) personal information of an object which has been subjected to optimization of the image pick-up condition by the image pick-up condition optimizing means and (b) personal information of an object which has not been subjected to optimization of the image pick-up condition by the image pick-up condition optimizing means are displayed in different styles.

With this, even in a case where a pick-up candidate image includes a plurality of images of objects corresponding to respective object feature learning information sets, the user can easily recognize an object which has been subjected to optimization of the image pick-up condition.

Note that the foregoing image pick-up device may be realized by a computer. In this case, a computer readable recording medium storing a control program for causing a computer to operate as each means so that the image pick-up device is realized by the computer is also included in the scope of the present invention.

Further, the present invention may also be realized as follows:

That is, the image pick-up device according to the present invention is an image pick-up device for an image pick-up of an object space, including: object learning means for (a) detecting, from image information obtained through an image pick-up of the object space, a predetermined object and (b) extracting an object learning information set by which the predetermined object is identified; an object learning information storing section for storing the object learning information set; pick-up candidate image information acquiring means for acquiring information of a pick-up candidate image, which is a candidate for an image to be picked up; image retrieval processing means for judging, in accordance with the information of the pick-up candidate image acquired and the object learning information set stored in advance in the object learning information storing section, whether or not an object corresponding to the object learning information set exists in the pick-up candidate image; image pick-up condition optimizing means for optimizing an image pick-up condition; and image pick-up condition adjusting means for instructing, in a case where the image retrieval processing means determines that an object corresponding to the object learning information set exists in the pick-up candidate image, the image pick-up condition optimizing means to cause the object in the pick-up candidate image to be subjected to optimization of the image pick-up condition.

The image pick-up device further includes priority level information assigning means for assigning, in a case where the object learning information storing section stores a plurality of object learning information sets, to at least one of the plurality of object learning information sets priority level information indicative of having priority over other one(s) of the plurality of object learning information sets.

The image pick-up device further includes: history record information storing section for storing, with regard to an object whose object learning information set is stored in the object learning information storing section, history record number information containing at least one of the number of sent e-mails, the number of received e-mails, the number of dialed phone calls, and the number of received phone calls, the priority level information assigning means assigning, in accordance with the history record number information, the priority level information to the object learning information set which is associated with the history record information.

The image pick-up device further includes: priority level acquiring means for accepting a priority level entered by a user with respect to said at least one of the plurality of object learning information sets, the priority level information assigning means assigning the priority level information in accordance with the priority level that the priority level acquiring means has accepted.

In a case where the image retrieval processing means determines that a plurality of objects corresponding to respective ones of the plurality of object learning information sets exist in the pick-up candidate image, the image retrieval processing means selects an object to be subjected to optimization of the image pick-up condition, in accordance with the priority level information assigned to the object learning information set.

The image pick-up device further includes: a personal information storing section for storing, with regard to an object whose object learning information set is stored in the object learning information storing section, personal information including at least one of: (i) a name; (ii) e-mail address; (iii) a phone number, (iv) an address; (v) a birthday; (vi) an individually assigned number; (vii) group identification information indicative of a group to which the object belongs in a case where the respective objects are classified into groups; (viii) information of a character to be set in place of an image of the object; (ix) the image of the object; and (x) thumbnail information containing two or more of the (i) through (ix); and indicating means for creating and indicating, in a case where the image retrieval processing means determines that an object whose personal information is stored in the personal information storing section exists in the pick-up candidate image, an image for the object existing in the pick-up candidate image, the image indicating at least one of the (i) through (x) of the personal information related to the object.

The image pick-up device further includes: an information storing section for storing information containing at least e-mail address of an object whose object learning information set is stored in the object learning information storing section; and communication control means for transmitting, in a case where (a) an image pick-up is carried out after optimization of the image pick-up condition and (b) information of an object that has been subjected to the optimization of the image pick-up condition is stored in the information storing section, image information obtained through the image pick-up to a terminal having the e-mail address associated with the object.

A method of controlling an image pick-up device for image picking up of an object space, including the steps of: (i) causing object learning means to (a) detect, from image information obtained through an image pick-up of the object space, a predetermined object and (b) extract an object learning information set by which the predetermined object is identified; (ii) causing pick-up candidate image information acquiring means to acquire information of a pick-up candidate image, which is a candidate for an image to be picked up; (iii) causing image retrieval processing means to judge whether or not an object corresponding to the object learning information set exists in the pick-up candidate image, in accordance with (a) the information of the image pick-up candidate image acquired and (b) the object learning information set stored in advance in an object learning information storing section for storing the object learning information set; and (iv) causing image pick-up condition adjusting means to instruct, in a case where the image retrieval processing means determines that an object corresponding to the object learning information set exists in the pick-up candidate image, image pick-up condition optimizing means, which optimizes an image pick-up condition, to cause the object in the pick-up candidate image to be subjected to optimization of the image pick-up condition.

The image pick-up device further includes: learning object display means for displaying images of objects to be subjected to whose features are to be learnt by object feature learning means such that (a) an image of an object which has been subjected to learning is distinguished from (b) an image of an object which has not been subjected to learning; and object feature learning data inquiring means for asking for a permission for the learning on each of the objects.

The indicating means further includes indication switching means for switching between (a) an indication mode for an image of an object which has been subjected to optimization by the optimizing means and (b) an indication mode for an image of an object which has not been subjected to optimization by the optimizing means.

INDUSTRIAL APPLICABILITY

As described above, in a case where a plurality of objects exist, an image pick-up device according to the present invention, a computer readable recording medium storing a program of controlling the image pick-up device, and a method of controlling the image pick-up device make it possible to more easily identify an object desired by a user and optimize an image pick-up condition for the object. Therefore, the present invention may preferably applied to an industrial field related to an image pick-up device for automatically optimizing an image pick-up condition such as a focus and/or brightness.

The invention claimed is:

1. A portable image pick-up device comprising:
   an image pick-up condition adjusting section that causes, in a case where a pick-up candidate image includes an image of an object which the image represents a feature matching with or being similar to a feature of an image of a predetermined object which the feature is represented by an object feature information, the object whose image is included in the pick-up candidate image to be subjected to optimization of an image pick-up condition, the pick-up candidate image being a candidate for an image to be picked up; and
   an indicating section that causes an image of at least one object in the pick-up candidate image to be surrounded by a frame so that an image of an object which is to be subjected to the optimization of the image pick-up condition is surrounded by a frame whose color or line is different from that of a frame surrounding an image of another object in the pick-up candidate image which is not to be subjected to the optimization,
   the indicating section being provided with a touch panel,
   the object feature information including information representing a feature of an image of an object frequently picked up as an object by a user,
   the image pick-up condition adjusting section selecting the object which is to be subjected to the optimization of the image pick-up condition, and then changing, in accordance with an instruction entered via the touch panel by the user, the object which is to be subjected to the optimization of the image pick-up condition to another object in the pick-up candidate image.

2. The portable image pick-up device as set forth in claim 1, wherein:
   the indicating section indicating personal information of at least one object included in the pick-up candidate image,
   the personal information includes at least one of: (i) a name; (ii) an e-mail address; (iii) a phone number, (iv) an address; (v) a birthday; (vi) an individually assigned number; (vii) group identification information indicative of a group to which the object belongs in a case where respective objects are classified into groups; (viii) information of a character to be set in place of an image of the object; (ix) the image of the object; and (x) thumbnail information containing two or more of the (i) through (ix).

3. A method of controlling a portable image pick-up device which is provided with a touch panel, comprising the steps of:
   (a) causing an image pickup condition adjusting section to cause, in a case where a pick-up candidate image includes an image of an object which the image represents a feature matching with or being similar to a feature of an image of a predetermined object which the feature is represented by an object feature information, the object whose image is included in the pick-up candidate image to be subjected to optimization of an image pick-up condition, the pick-up candidate image being a candidate for an image to be picked up, and the object feature information including information representing a feature of an image of an object frequently picked up as an object by a user; and
   (b) causing an image of at least one object in the pick-up candidate image to be surrounded by a frame so that an image of an object which is to be subjected to the optimization of the image pick-up condition is surrounded by a frame whose color or line is different from that of a frame surrounding an image of another object in the pick-up candidate image which is not to be subjected to the optimization,
   (c) changing, after step (a) and in accordance with an instruction entered via the touch panel by the user, the object which is to be subjected to the optimization of the image pick-up condition to another object in the pick-up candidate image.

4. A non-transitory computer readable recording medium storing a control program for controlling a computer to execute each step as set forth in claim 3.

5. A portable terminal comprising:
   a portable pick-up device as set forth in claim 1; and
   communication means.

* * * * *